US012677165B2

(12) United States Patent
Shete et al.

(10) Patent No.: US 12,677,165 B2
(45) Date of Patent: Jul. 7, 2026

(54) SYSTEMS AND METHODS FOR O-CLOUD RESOURCE OPTIMIZATION FOR RADIO ACCESS NETWORK (RAN) SHARING IN AN OPEN RADIO ACCESS NETWORK (O-RAN)

(71) Applicant: RAKUTEN MOBILE, INC., Tokyo (JP)

(72) Inventors: Pankaj Shete, Tokyo (JP); Awn Muhammad, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 539 days.

(21) Appl. No.: 18/012,093

(22) PCT Filed: Oct. 12, 2022

(86) PCT No.: PCT/US2022/046360
§ 371 (c)(1),
(2) Date: Dec. 21, 2022

(87) PCT Pub. No.: WO2024/080981
PCT Pub. Date: Apr. 18, 2024

(65) Prior Publication Data
US 2024/0267752 A1 Aug. 8, 2024

(51) Int. Cl.
*H04W 24/02* (2009.01)
*H04W 24/08* (2009.01)
*H04W 60/04* (2009.01)

(52) U.S. Cl.
CPC ........... *H04W 24/02* (2013.01); *H04W 24/08* (2013.01); *H04W 60/04* (2013.01)

(58) Field of Classification Search
CPC ...... H04W 24/02; H04W 24/08; H04W 60/04
(Continued)

(56) References Cited

U.S. PATENT DOCUMENTS

2018/0191581 A1* 7/2018 Yu .......................... H04L 41/042
2019/0268213 A1* 8/2019 Zhou ...................... H04L 41/046
(Continued)

FOREIGN PATENT DOCUMENTS

WO WO-2017185251 A1 * 11/2017 ......... G06F 9/45558
WO WO-2022165373 A1 * 8/2022

OTHER PUBLICATIONS

Polese et al. (Understand O-RAN: Architecture, Interfaces, Algorithms, Security, and Research Challenges, 33 pages, Dated Aug. 1, 2022 (Year: 2022).*
(Continued)

*Primary Examiner* — Rebecca E Song
*Assistant Examiner* — Jean F Voltaire
(74) *Attorney, Agent, or Firm* — Sughrue Mion, PLLC

(57) ABSTRACT

A method performed by a processor executing a first application includes receiving, information regarding one or more sharing services registered by a second application. The method includes transmitting a subscription request to the one or more sharing services. The method includes receiving, over the interface from the second application in response to the subscription request, a subscription confirmation indicating a successful subscription to the one or more sharing services. The method includes transmitting, over the interface to the second application, a network function instantiation request that requests instantiation of a network function that utilizes the one or more network resources of the second network operator. The method includes receiving, in response to the network function instantiation request, a notification confirming that the network function is instantiated. The method further includes monitoring performance of the instantiated network function on the one or more network resources.

16 Claims, 21 Drawing Sheets

(58) Field of Classification Search
USPC ........................................................ 370/329
See application file for complete search history.

(56)                          References Cited

U.S. PATENT DOCUMENTS

| 2021/0204148 | A1* | 7/2021 | Chou | ................... | H04W 24/02 |
| 2022/0295309 | A1* | 9/2022 | Akhtar | ................. | H04W 24/02 |
| 2024/0077567 | A1* | 3/2024 | Liou | ..................... | G01S 5/0027 |
| 2024/0147402 | A1* | 5/2024 | Wu | ........................ | H04W 8/24 |

OTHER PUBLICATIONS

WO-2022165373-A1 (Year: 2022).*
International Search Report dated Mar. 20, 2023 in Application No. PCT/US2022/046360.
Written Opinion of the International Searching Authority dated Mar. 20, 2023 in Application No. PCT/US2022/046360.
Polese et al., "Understanding O-RAN: Architecture, Interfaces, Algorithms, Security, and Research Challenges", Arxiv, Aug. 1, 2022, pp. 1-33 (33 total pages), Retrieved from internet: URL: <https://arxiv.org/abs/2202.01032>.

* cited by examiner

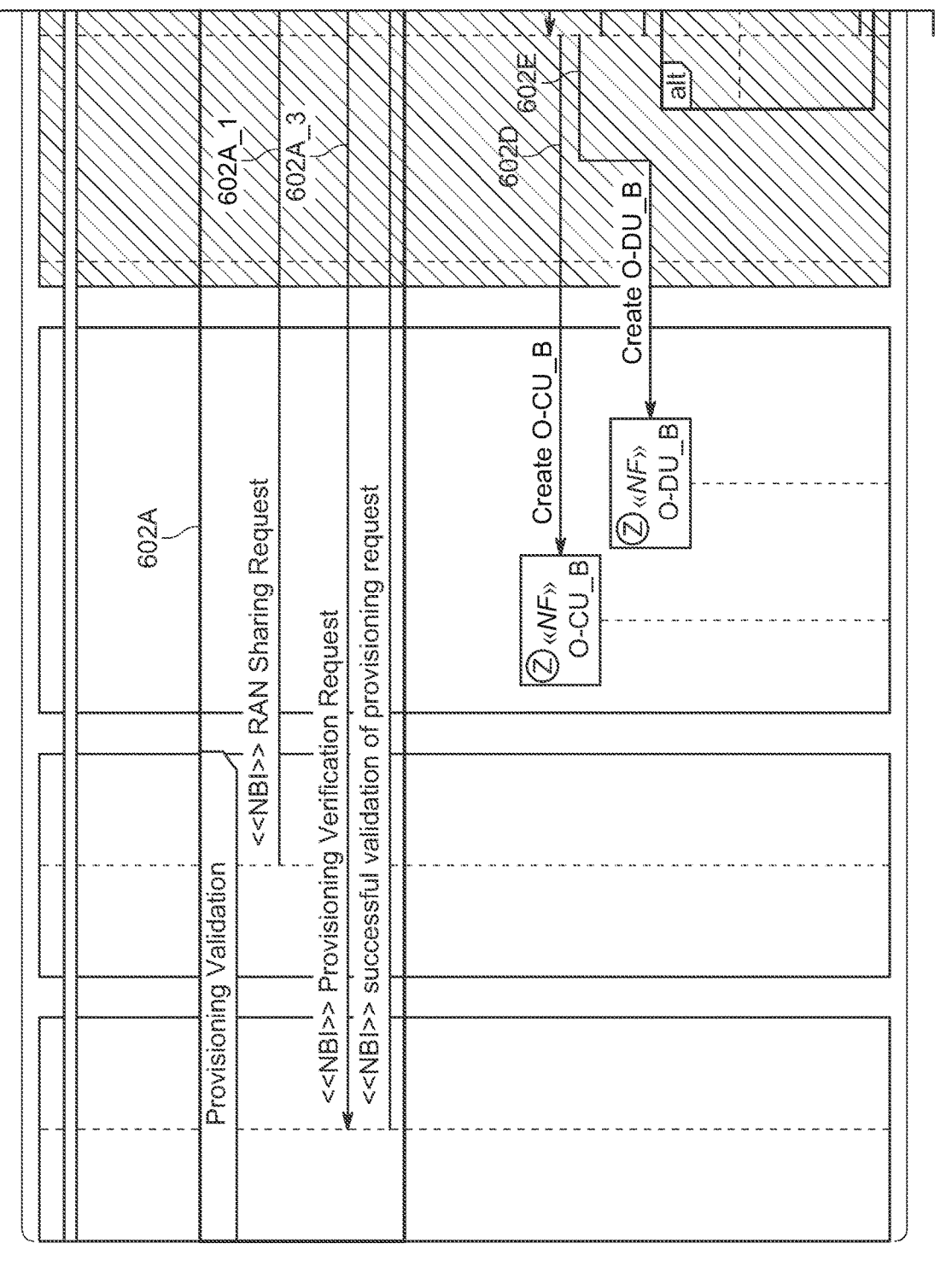
FIG. 6B_1

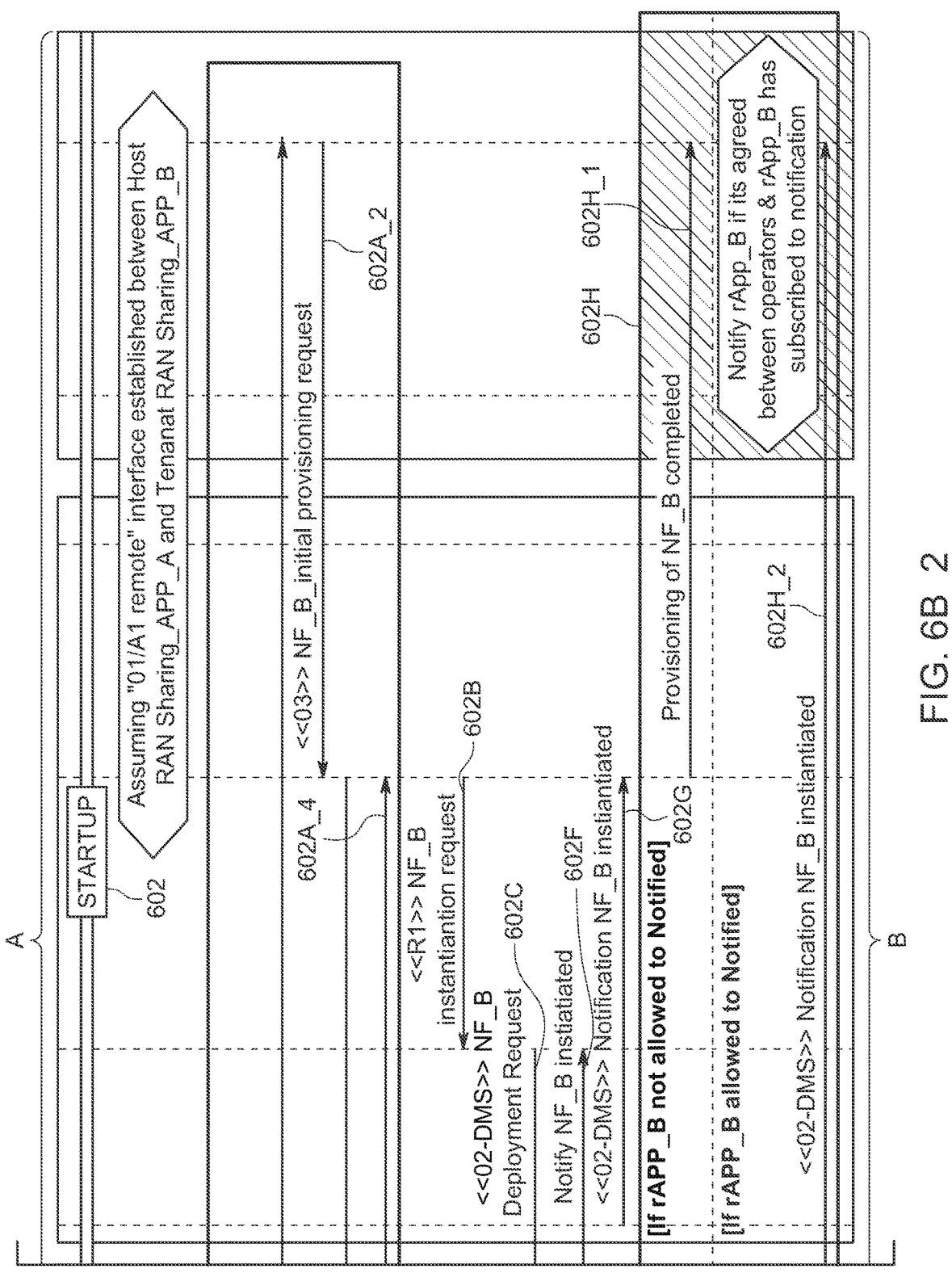
FIG. 6B_2

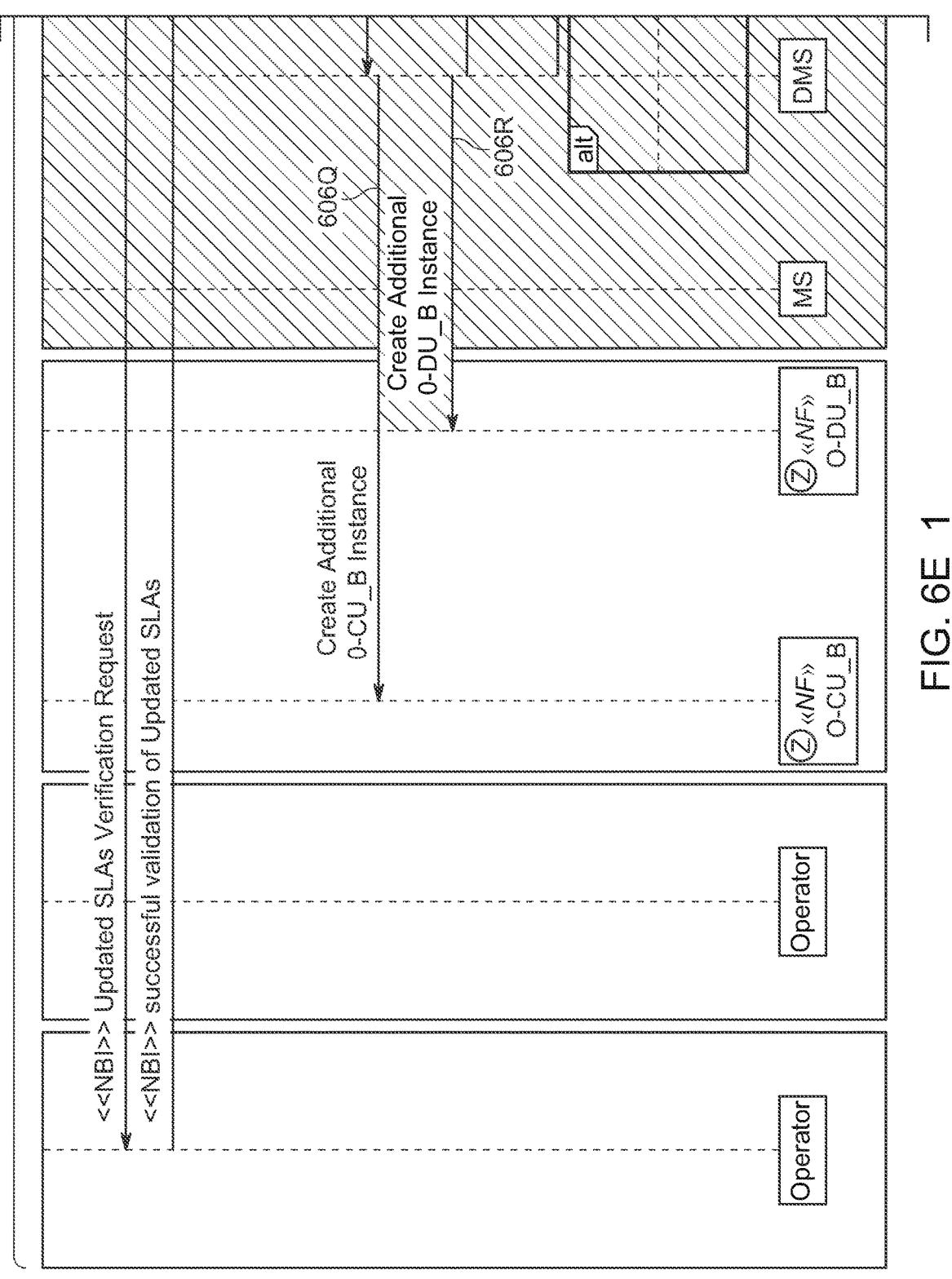
FIG. 6E_1

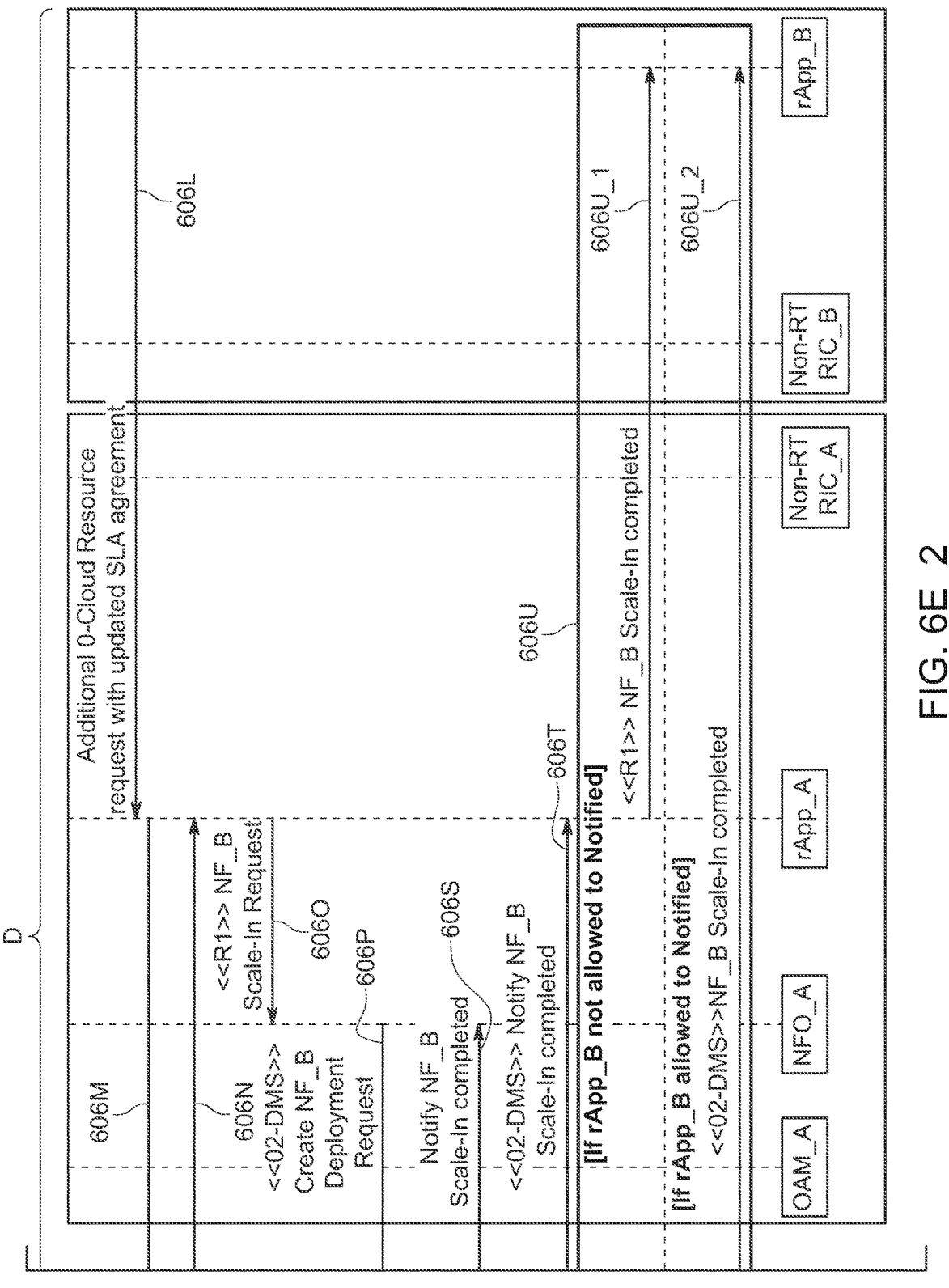
FIG. 6E_2

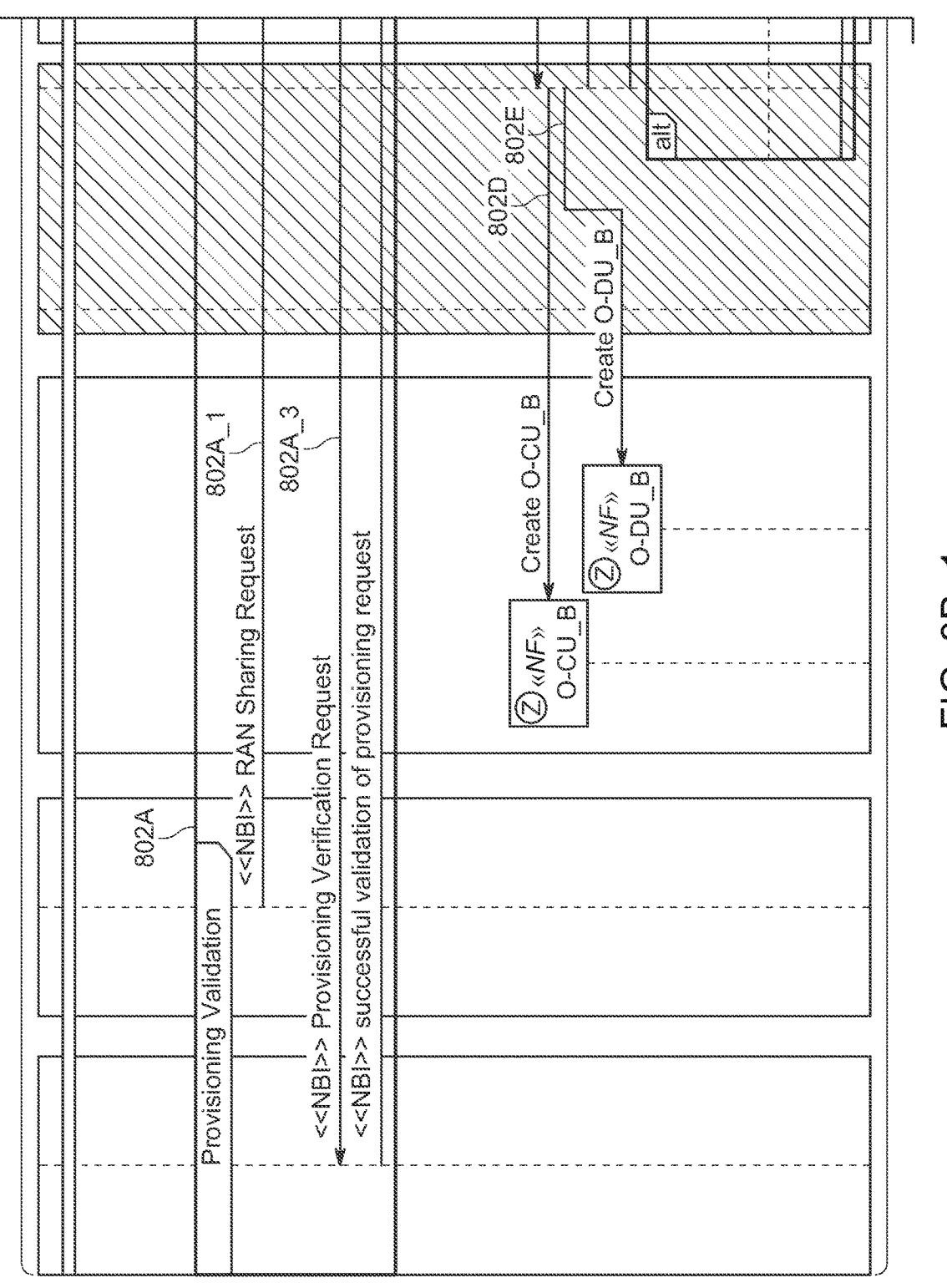
FIG. 8B_1

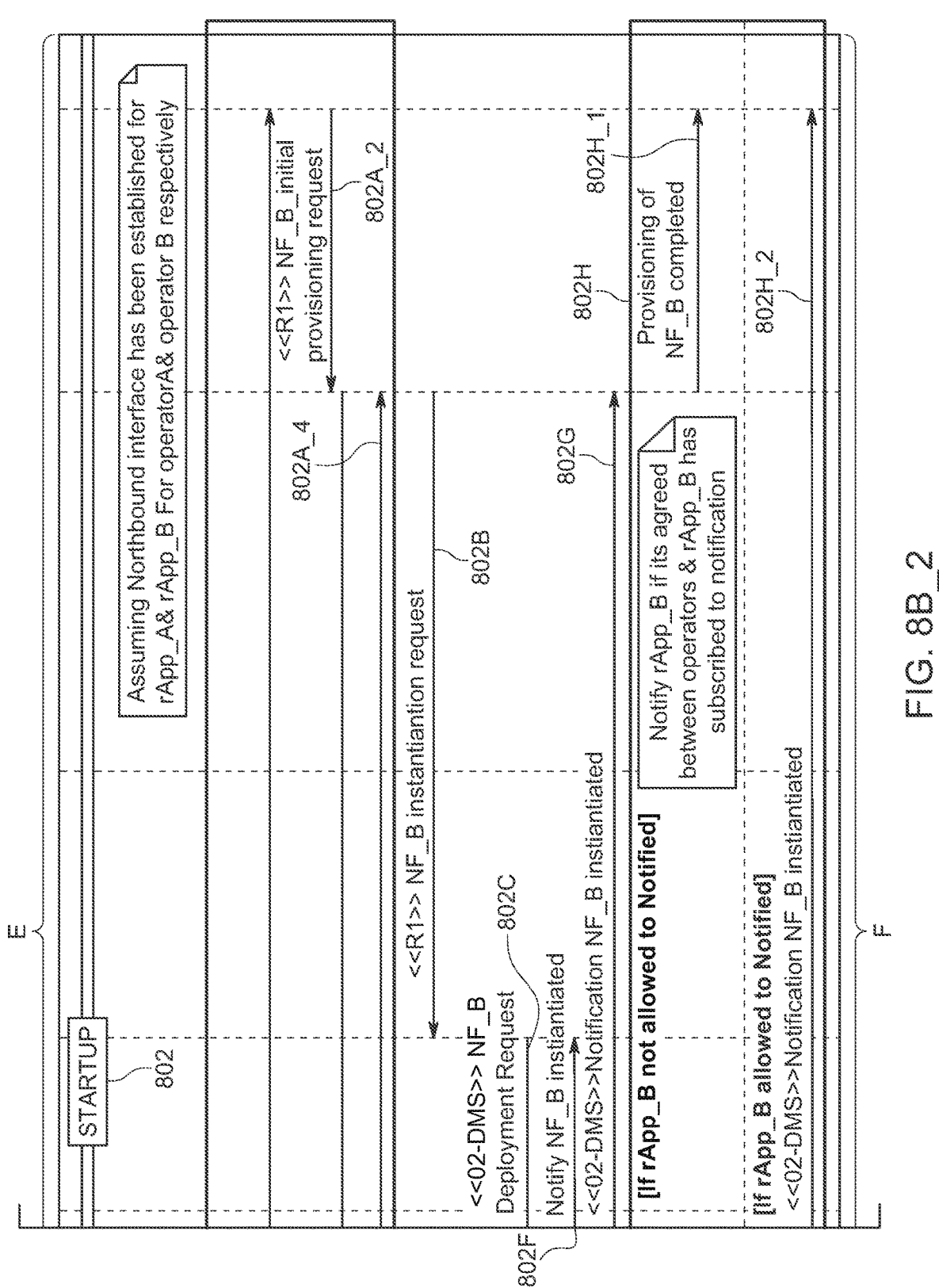
FIG. 8B_2

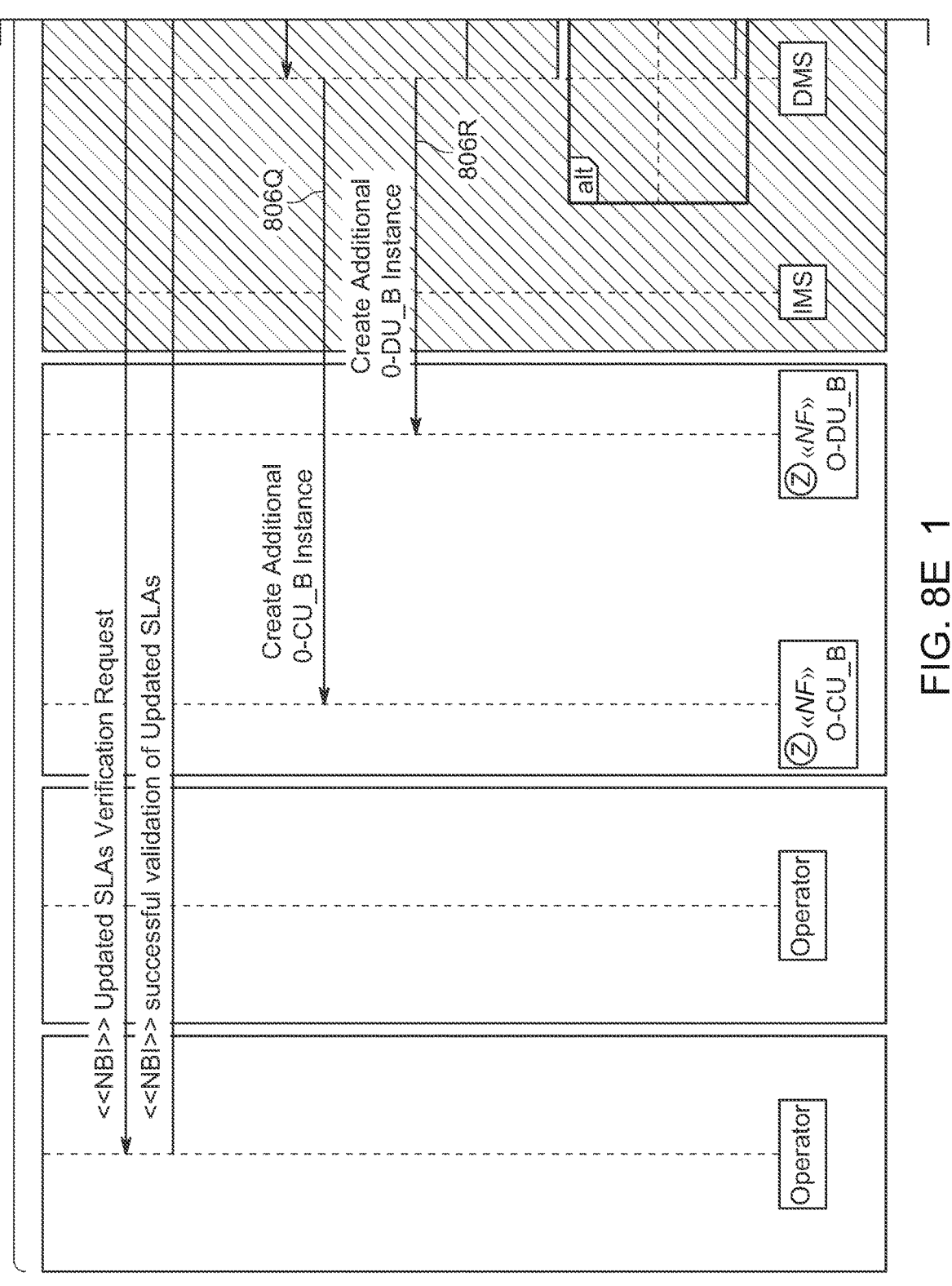
FIG. 8E_1

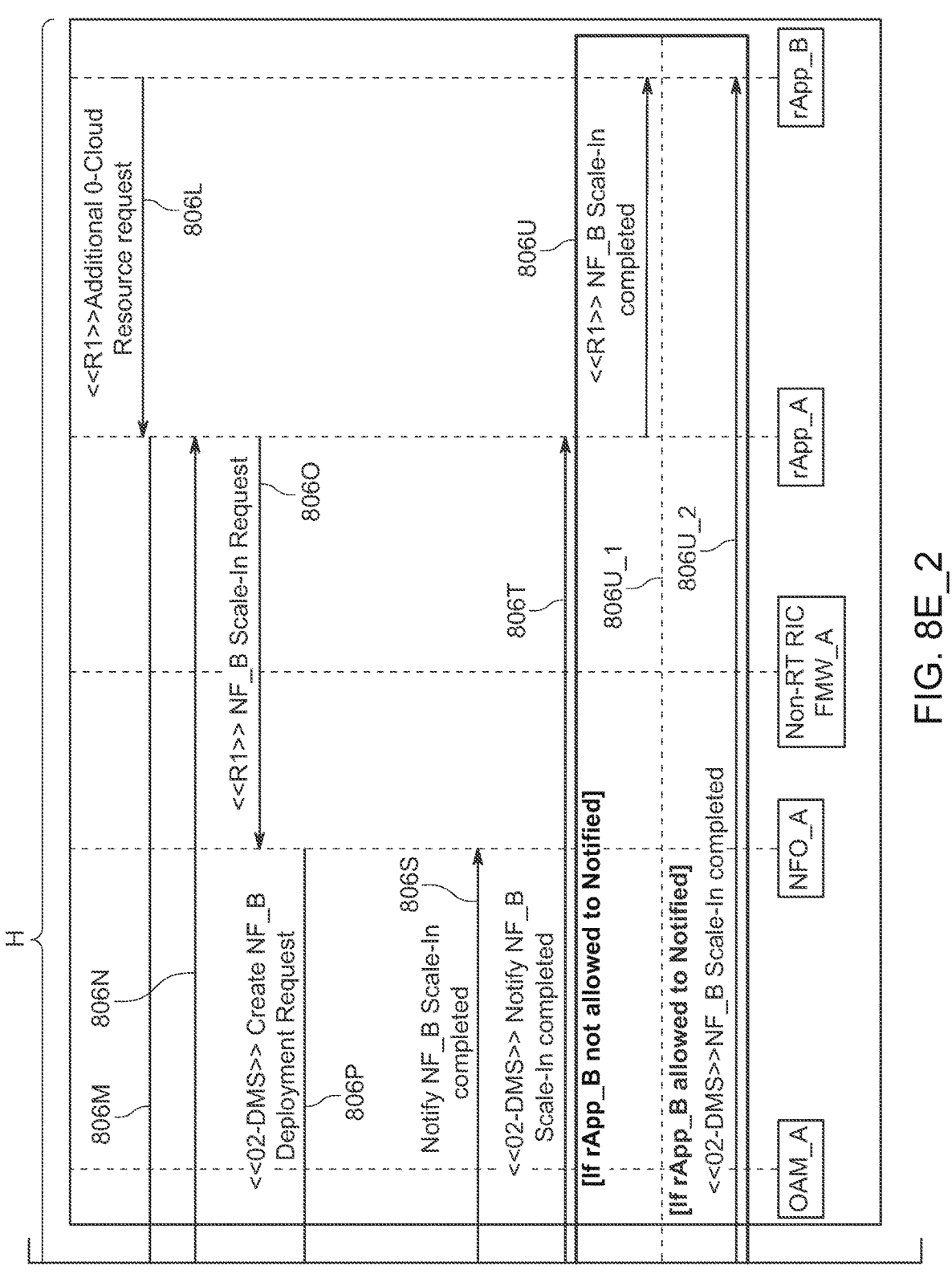
FIG. 8E_2

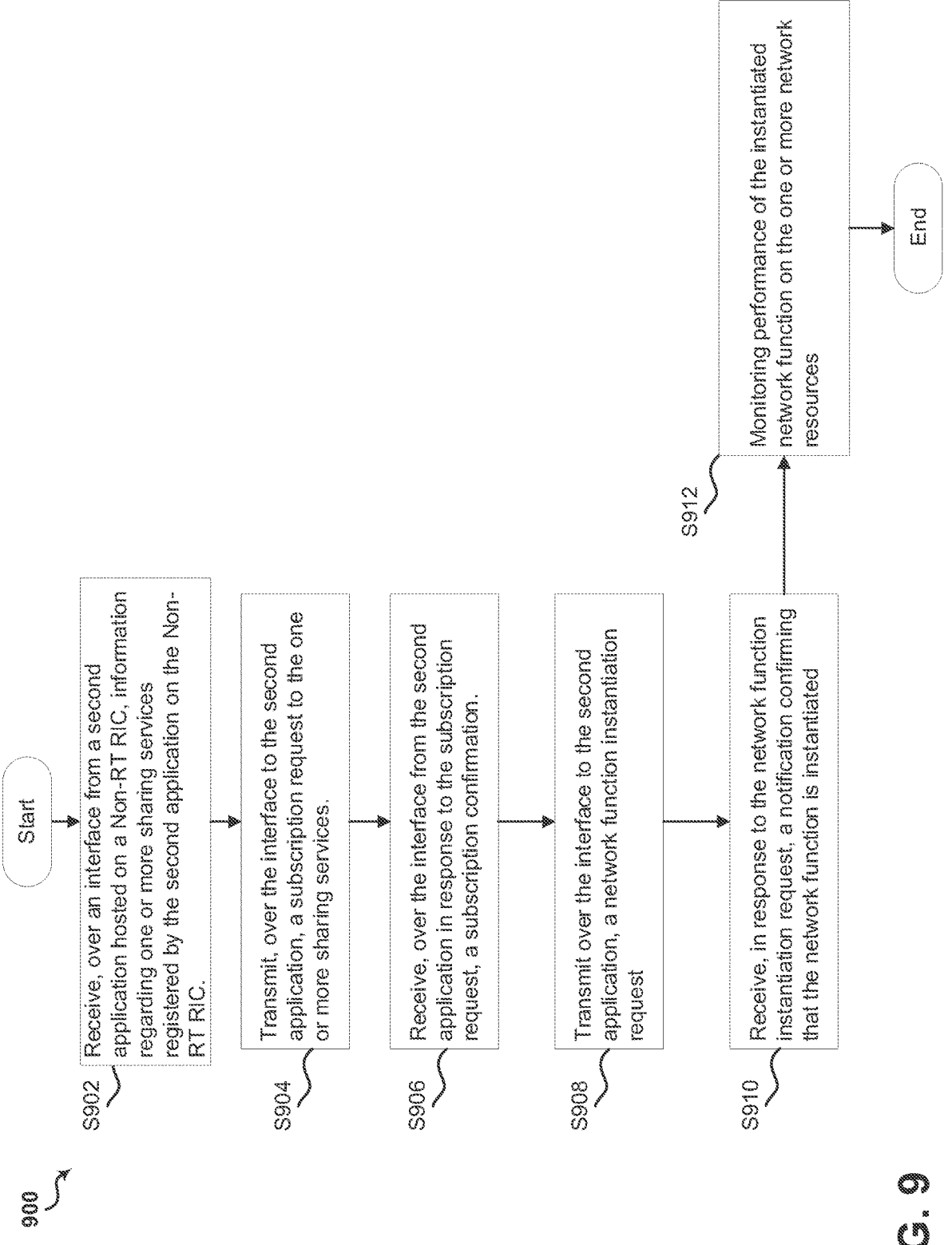

900

Start

S902   Receive, over an interface from a second application hosted on a Non-RT RIC, information regarding one or more sharing services registered by the second application on the Non-RT RIC.

S904   Transmit, over the interface to the second application, a subscription request to the one or more sharing services.

S906   Receive, over the interface from the second application in response to the subscription request, a subscription confirmation.

S908   Transmit over the interface to the second application, a network function instantiation request S910   Receive, in response to the network function instantiation request, a notification confirming that the network function is instantiated S912   Monitoring performance of the instantiated network function on the one or more network resources End

FIG. 9

SYSTEMS AND METHODS FOR O-CLOUD RESOURCE OPTIMIZATION FOR RADIO ACCESS NETWORK (RAN) SHARING IN AN OPEN RADIO ACCESS NETWORK (O-RAN)

CROSS REFERENCE TO RELATED APPLICATIONS

This application is a National Stage of International Application No. Entry of PCT/US2022/046360 filed Oct. 12, 2022.

TECHNICAL FIELD

Apparatuses and methods consistent with example embodiments of the present disclosure relate to O-Cloud resource optimization for network resource sharing in an Open Radio Access Network (O-RAN).

BACKGROUND

Radio Access Network (RAN) sharing is an increasingly popular method used by carriers to cost-effectively increase at least one of the operator's coverage. For example, a host operator may share network resources with a tenant operator. In the current open radio access network (O-RAN) framework, the non-real time RAN intelligent controller (Non-RT RIC) rApp is unable to perform dynamic optimization of O-cloud resources to meet agreed service level agreements (SLAs) between the host and tenant operators for RAN sharing.

Particularly, in the current O-RAN framework, the Non-RT RIC rApp is limited to perform data analytics and optimization of RAN resources. However, the RAN sharing use case defined by WG1 UCTG does not describe how SLAs agreed between host and tenant operators are used to optimize O-Cloud infrastructure resources through the Non-RT RIC rApp. Also, policy-based assistance to the service management and orchestration (SMO) anchored functions (such as network function orchestrator (NFO) and federated O-cloud orchestration and management (FOCOM)) are missing, which makes these SMO functions less operator friendly and reduces access to intelligence learning through the artificial intelligence machine learning (AIML) framework. Therefore, the current O-RAN framework does not provide a feasible solution for operators to perform dynamic optimization of O-cloud resources along with RAN resources to meet agreed SLAs between the host and tenant operators for RAN sharing.

Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for O-Cloud resource optimization for network resource sharing in an Open Radio Access Network (O-RAN).

According to an exemplary embodiment, a method is performed by at least one processor executing a first application that is associated with a first network operator. The method includes receiving, over an interface from a second application hosted on a non-real time (Non-RT) radio access network (RAN) intelligent controller (RIC), information regarding one or more sharing services registered by the second application on the Non-RT RIC, the second application associated with a second network operator, the one or more sharing services corresponding to one or more network resources associated with the second network operator. The method further includes transmitting, over the interface to the second application, a subscription request to the one or more sharing services. The method further includes receiving, over the interface from the second application in response to the subscription request, a subscription confirmation indicating a successful subscription to the one or more sharing services. The method further includes transmitting, over the interface to the second application, a network function instantiation request that requests instantiation of a network function that utilizes the one or more network resources of the second network operator. The method further includes receiving, in response to the network function instantiation request, a notification confirming that the network function is instantiated. The method further includes monitoring performance of the instantiated network function on the one or more network resources.

According to an exemplary embodiment, an apparatus executing a first application, the first application associated with a first network operator, the apparatus includes at least one memory configured to store computer program code, and at least one processor configured to access said at least one memory and operate as instructed by said computer program code. The computer program code includes first receiving code configured to cause at least one of said at least one processor to, over an interface from a second application hosted on a non-real time (Non-RT) radio access network (RAN) intelligent controller (RIC), receive information regarding one or more sharing services registered by the second application on the Non-RT RIC, the second application associated with a second network operator, the one or more sharing services corresponding to one or more network resources associated with the second network operator. The computer program code further includes first transmitting code configured to cause at least one of said at least one processor to, over the interface to the second application, transmit a subscription request to the one or more sharing services. The computer program code further includes second receiving code configured to cause at least one of said at least one processor to, over the interface from the second application in response to the subscription request, receive a subscription confirmation indicating a successful subscription to the one or more sharing services. The computer program code further includes second transmitting code configured to cause at least one of said at least one processor to, over the interface to the second application, transmit a network function instantiation request that requests instantiation of a network function that utilizes the one or more network resources of the second network operator. The computer program code further includes third receiving code configured to cause at least one of said at least one processor to, in response to the network function instantiation request, receive a notification confirming that the network function is instantiated. The computer program code further includes monitoring code configured to cause at least one of said at least one processor to monitor performance of the instantiated network function on the one or more network resources.

According to an exemplary embodiment, a non-transitory computer readable medium having instructions stored therein, which when executed by a processor executing a first application associated with a first network operator cause the processor to execute a method. The method includes receiving, over an interface from a second application hosted on a non-real time (Non-RT) radio access network (RAN) intelligent controller (RIC), information regarding one or more sharing services registered by the second application on the Non-RT RIC, the second application associated with a second network operator, the one or more sharing services corresponding to one or more network resources associated with the second network operator. The method further includes transmitting, over the interface to the second application, a subscription request to the one or more sharing services. The method further includes receiving, over the interface from the second application in response to the subscription request, a subscription confirmation indicating a successful subscription to the one or more sharing services. The method further includes transmitting, over the interface to the second application, a network function instantiation request that requests instantiation of a network function that utilizes the one or more network resources of the second network operator. The method further includes receiving, in response to the network function instantiation request, a notification confirming that the network function is instantiated. The method further includes monitoring performance of the instantiated network function on the one or more network resources.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIGS. 6A-6E_2 illustrate an example sequence diagram for sharing network resources.

FIGS. 8A-8E_2 illustrate an example sequence diagram for sharing network resources.

FIG. 9 illustrates an example flow chart of a network resource sharing process.

DETAILED DESCRIPTION

Figure 1:
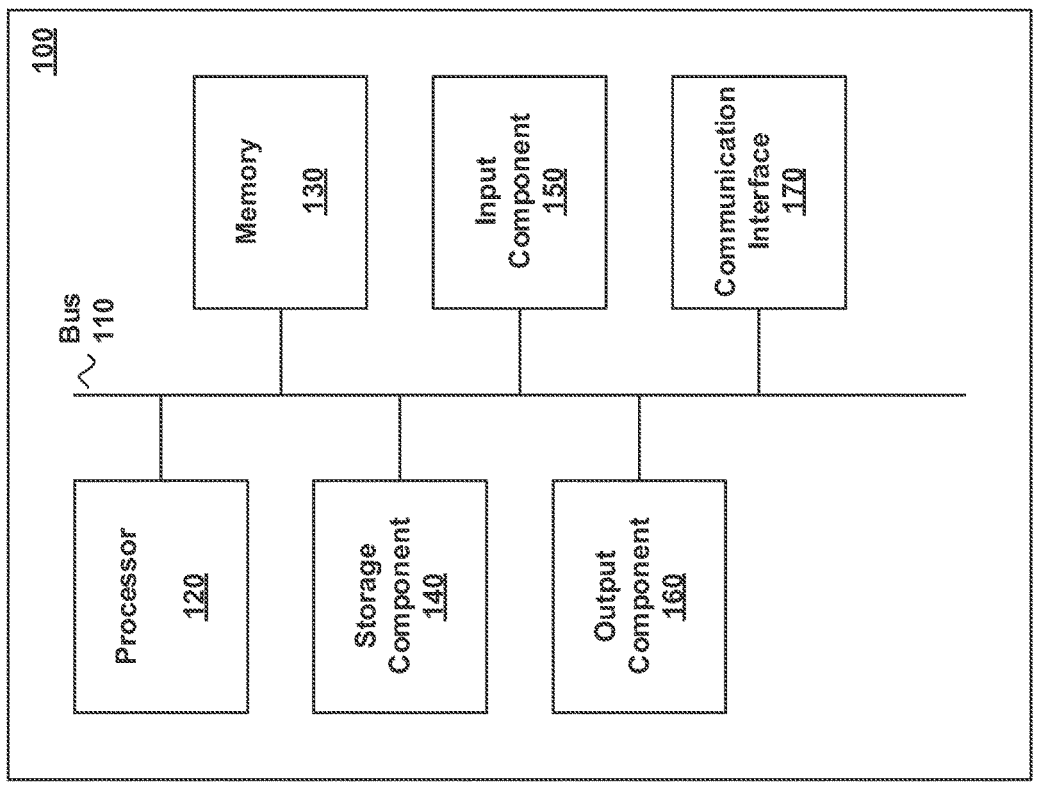
FIG. 1 is a diagram of an example network device in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to performing dynamic optimization of a host operator's O-cloud resources along with RAN resources for RAN sharing (including multi-operator core network (MOCN) and multi-operator radio access network (MORAN)) through the Non-RT RIC (rApp) installed on host and tenant operator SMO platforms. Embodiments of the present disclosure utilize the R1 interface between rApp and Non-RT RIC to enhance O-cloud resource optimization for RAN sharing.

RAN sharing provides an efficient and sustainable way to reduce the network deployment costs, while increasing network capacity and coverage. Accordingly, the open and multivendor nature of the O-RAN architecture can accelerate the introduction and development of RAN sharing solutions, by enhancing the deployment and configuration of virtual RAN network functions on commodity shared hardware.

FIG. 1 is a diagram of an example device 100 for implementing the methods of the present disclosure. Device 100 may implement any of the rApps disclosed herein, as well as the O-RAN RIC, and the AI/ML framework. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, and the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may be included in the core network 240 and perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
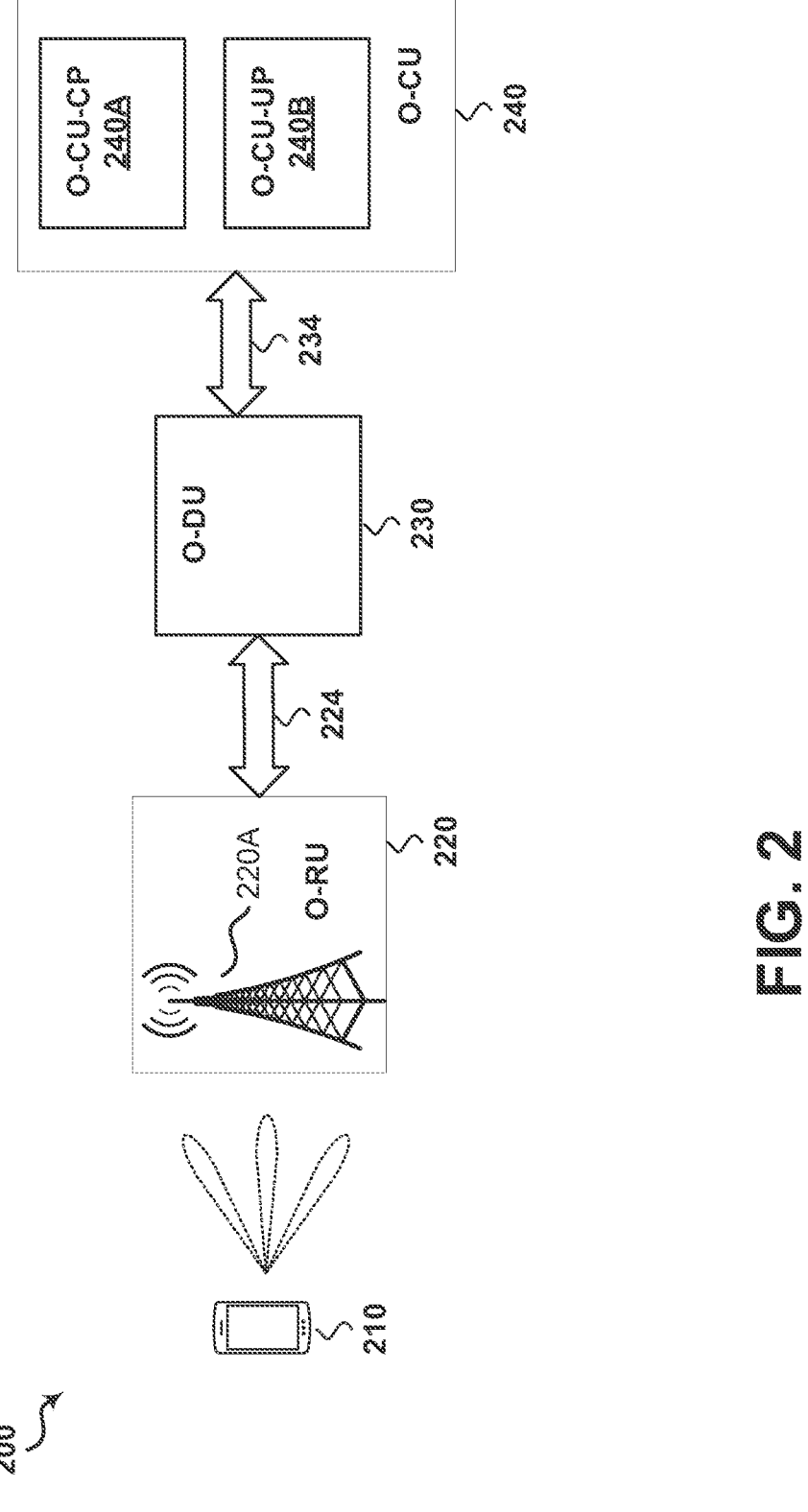
FIG. 2 is a schematic diagram of an example O-RAN communications system, in accordance with various embodiments of the present disclosure.

FIG. 2 is a diagram illustrating an example O-RAN communication system 200, according to various embodiments of the present disclosure. The O-RAN communication system 200 may include one or more user equipment (UE) 210, one or more O-RAN Radio Units (O-RU) 220 that includes one or more base stations 220a, one or more O-RAN Distribution Units (O-DU) 230, and one or more O-RAN Centralized Units (O-CU) 240.

Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IoT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220A of the O-RU 220 may wirelessly communicate with the one or more UEs 210. Each base station of the one or more base stations 220A may provide communication coverage to one or more UEs 210 located within a geographic coverage area of that base station 220A. In some embodiments, as shown in FIG. 2, the base station 220A may transmit one or more beamformed signals to the one or more UEs 210 in one or more transmit directions. The one or more UEs 210 may receive the beamformed signals from the base station 220A in one or more receive directions. Alternatively or additionally, the one or more UEs 210 may transmit beamformed signals to the base station 220 in one or more transmit directions. The base station 220A may receive the beamformed signals from the one or more UEs 210 in one or more receive directions.

The one or more base stations 220A may include macrocells (e.g., high power cellular base stations) and/or small cells (e.g., low power cellular base stations). The small cells may include femtocells, picocells, and microcells. A base station 220A, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

In some embodiments, the O-RU 220 may be connected to the O-DU 230 via a FH link 224. The FH link 224 may be a 25 Gbps line in which User Plane (U-plane) and Control Plane (C-Plane) packets are downloaded from the O-DU 230 to the O-RU 220. In some embodiments, the O-DU 230 may be connected to the O-CU 240 via a midhaul link 234. The O-CU 240 may include an O-CU Control Plane (O-CU-CP) packet generator 240A and an O-CU User Plane (O-CU-UP) packet generator 240B. C-plane and U-plane packets may originate from the O-CU-CP packet generator 240A and the O-CU-UP packet generator 240B, respectively.

Figure 3:
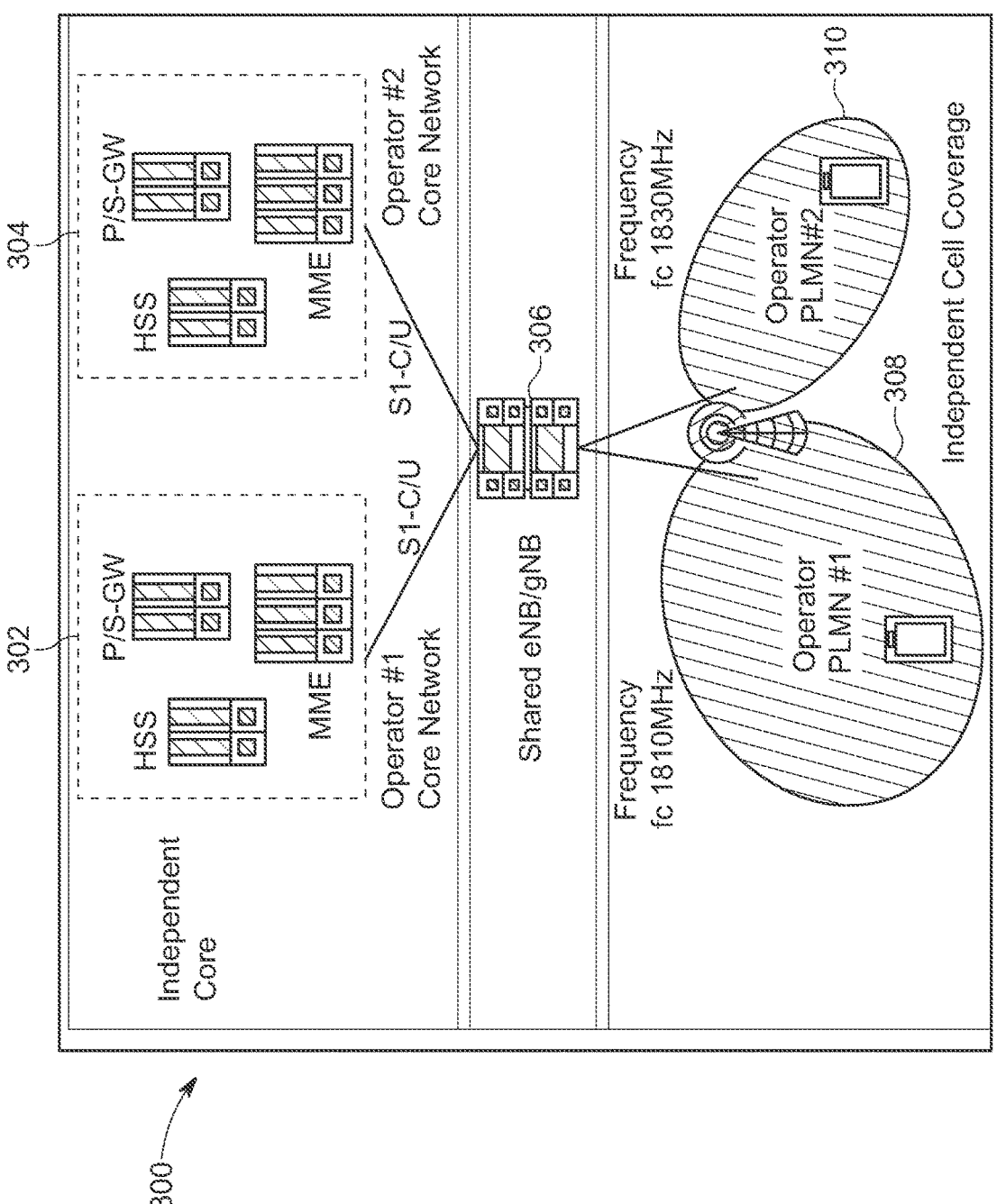
FIG. 3 illustrates an example multi-operator radio access network (MORAN), in accordance with various embodiments of the present disclosure.

RAN sharing may be achieved by at least two embodiments: MORAN and MOCN. In the MORAN architecture, the eNBs/gNBs are shared, while the core network is proprietary to each network provider. The MORAN may also include RAN sharing using dedicated radio frequencies assigned to each service provider. In this approach, the operators can independently control the cell level (e.g., each operator can decide their own optimization parameters, Tx Power to control the cell range and interference). FIG. 3 illustrates an example MORAN architecture 300 that includes operator core network 302 and operator core network 304 that share eNB/gNB 306. As illustrated in FIG. 3, the shared eNB/gNB 306 provides independent cell coverage to operator PLMN 308 and operator PLMN 310.

Figure 4:
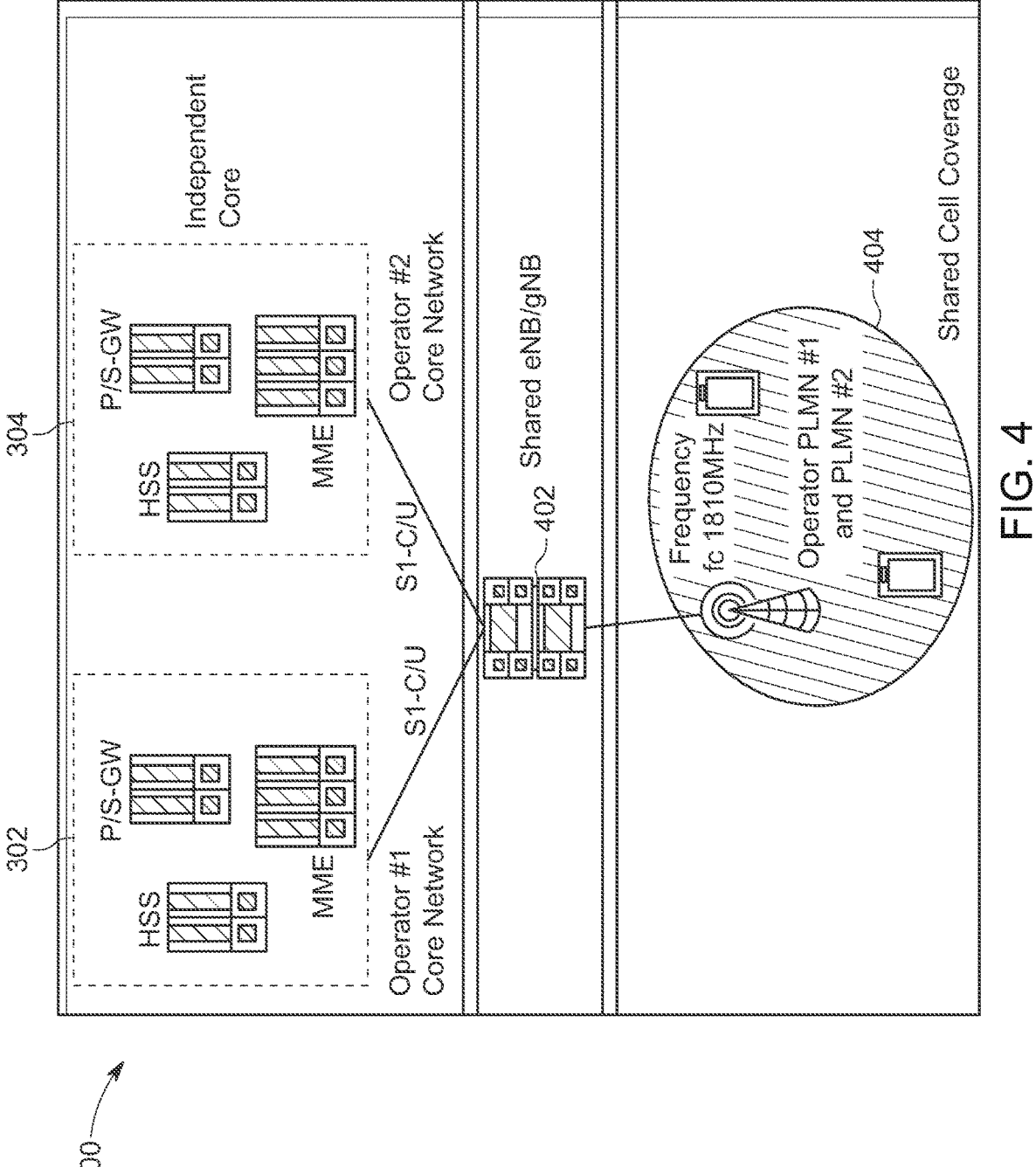
FIG. 4 illustrates an example multi-operator core network (MOCN), in accordance with various embodiments of the present disclosure.

In the MOCN architecture, the same architectural elements as MORAN may be shared (e.g., eNBs/gNBs). However, in MOCN, the operators may also share frequencies, which prevents the operators from being able to control their networks at the cell level. FIG. 4 illustrates an example MOCN architecture 400 in which the operators share the same cell 404.

Figure 5:
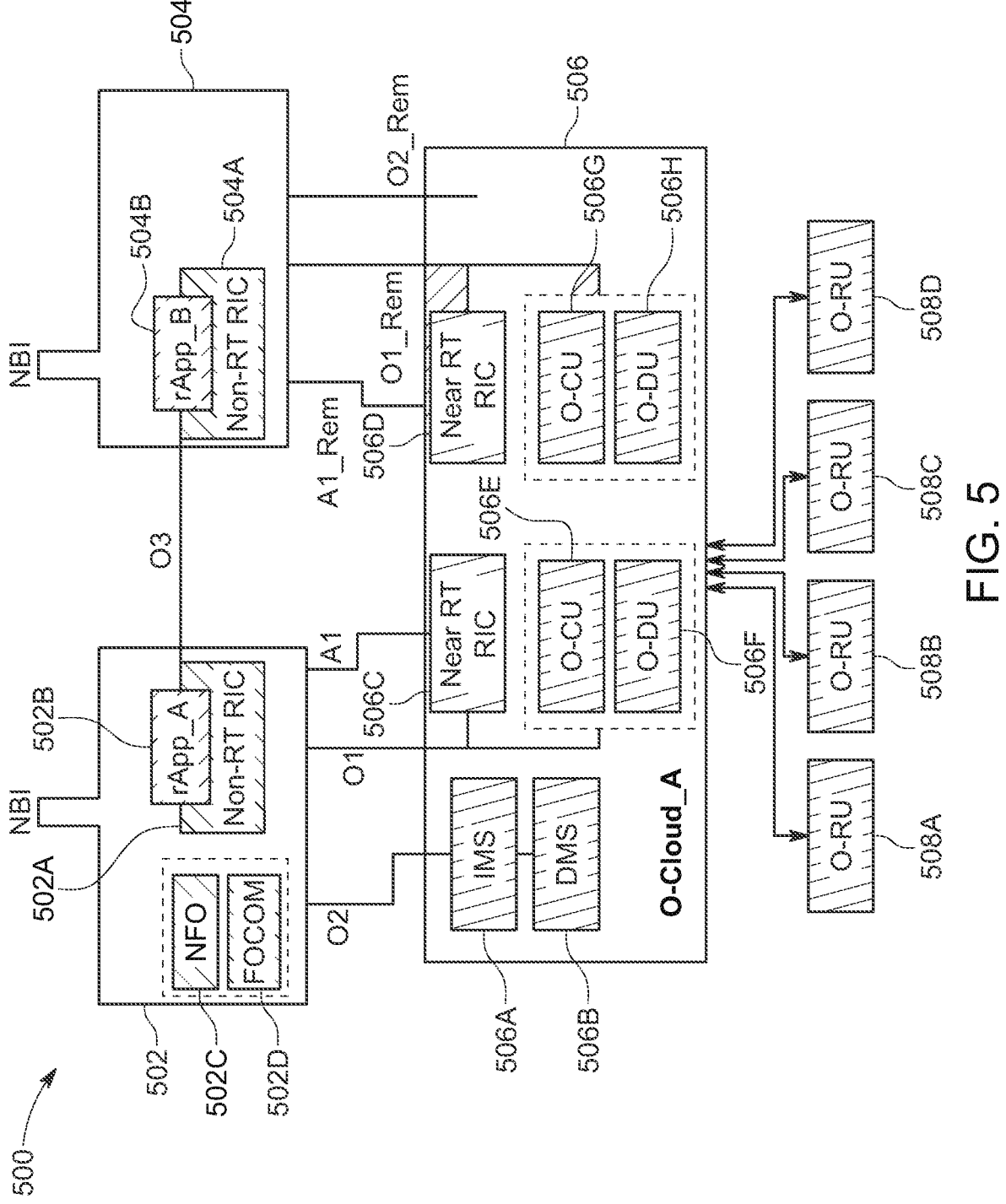
FIG. 5 illustrates an example network architecture with two network operators located in separate service management and orchestration (SMO) platforms, in accordance with various embodiments of the present disclosure.

FIG. 5 illustrates an example network architecture 500 where a tenant operator and a host operator are in separate SMOs. For example the host operator may be located on SMO 502 while the tenant operator is located on SMO 502. SMO 502 includes Non-RT RIC 502A and rApp_A 502B. SMO 502 further includes NFO 502C and 502D. SMO 504 includes Non-RT 504A and rApp_B 504B. The host operator and tenant operators may communicate with other via a north bound interface (NBI). The applications rApp_A 502B and rApp_B 504B may communicate with each other via interface O3. In this scenario, rApp_A 502B is an application from the host operator hosted on Non-RT RIC 502A, and rApp_B 504B is an application of tenant operator 504 hosted on Non-RT RIC 504A.

The O3 interface is a new interface established between two different Non-RT RIC to communicate SLAs, policies, intent, etc. from the tenant operator to the host operator and feedback from the host operator to the tenant operator. The rApp_B 504B may provide initial intent to instantiate network functions (NFs) on the O-Cloud of the host operator (O-Cloud_A 506). The rApp_A 502B may work as a verification and policy translation function for rApp_B 504B.

The host RAN sharing rApp_A 502B may register RAN sharing services with Non-RT RIC 502A, and the tenant RAN sharing rApp_B 502B may subscribe to these services to perform RAN sharing over the O3 interface. The R1 interface may provide SME services to the O3 interface to subscribe to RAN sharing services.

The host operator may be associated with O-Cloud_A resources 506 that are shared with the tenant operator. The O-Cloud_A resources 506 include an infrastructure management services (IMS) 506A and a deployment management services (DMS) 506B. The O-Cloud_A resources may include a near-RT RIC 506C associated with SMO 502, and a near-RT RIC 506D associated with the SMO 504. The near-RT 506C may control O-CU 506E and O-DU 506F, and the near-RT 506D may control O-CU 506G and O-DU 506H. The O-Cloud_A may communicate with shared RAN resources O-RUs 508A—508D. The O-RUs may be shared or independent among the host and tenant operator. The SMO 502 may communicate with the O-Cloud_A 506 using the O2, O1, and A1 interface. The SMO 504 may collect data using the A1_Rem, O1_Rem, and O2_Rem interfaces.

FIGS. 6A-6E_2 illustrate example sequence diagrams. In FIGS. 6A-6E_2, Operator A may correspond to the host operator, and Operator B may correspond to the tenant operator. The O-RAN (Site A) and the SMO (Site A) including the OAM_A, NFO_A, rApp_A, and Non-RT RIC_A may be associated with Operator A. The SMO (Site B), rApp_B, and Non-RT RIC_B may be associated with Operator B.

Figure 6A:
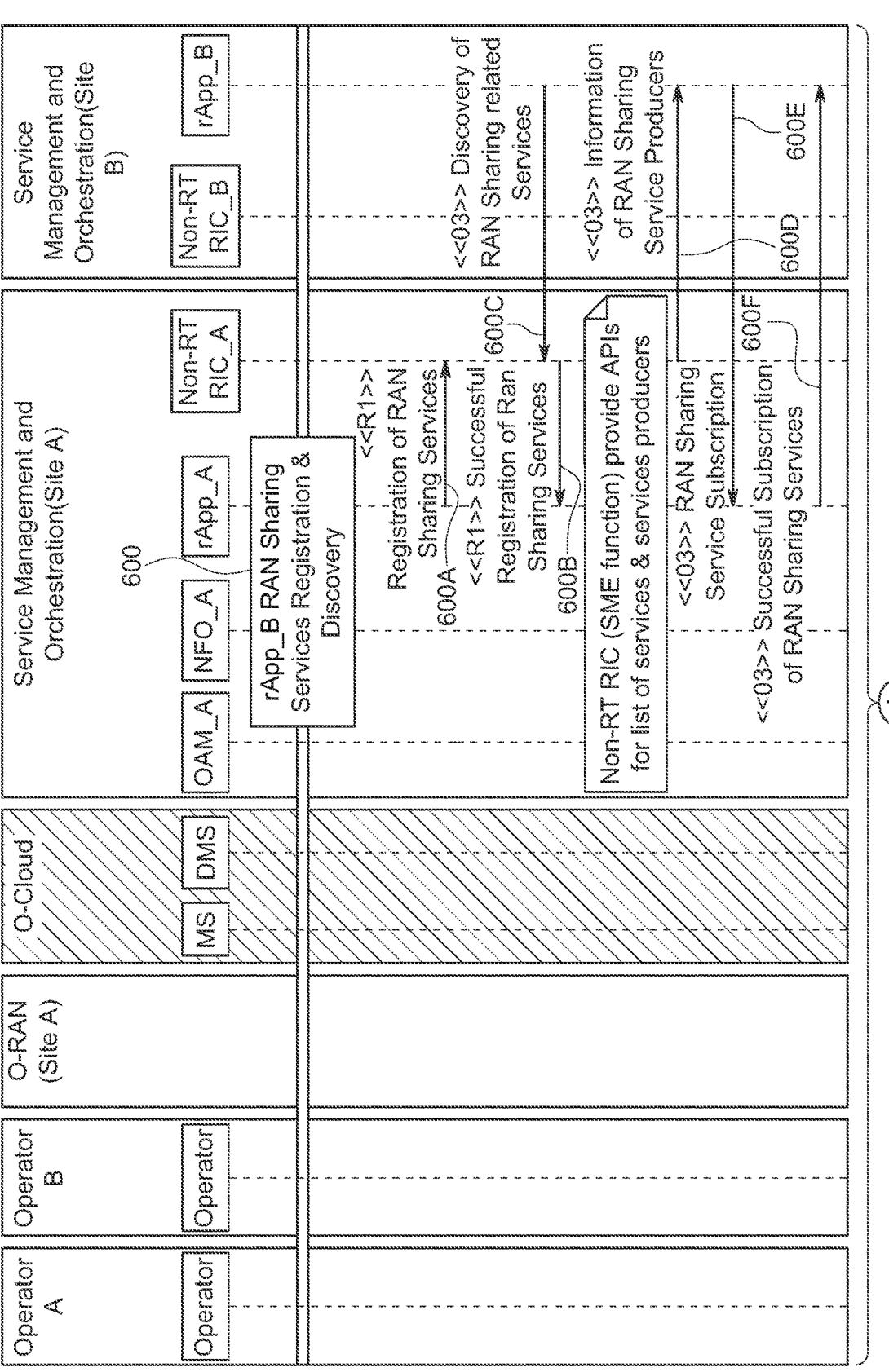

FIG. 6A illustrates a sequence diagram of an embodiment of a RAN sharing services registration and discovery process 600 in which the rApp_A may register as a RAN sharing service producer to the Non-RT RIC_A and in which rApp_B may discover and subscribe to those services from the Non-RT RIC_A. The process may start at operation 600A where the rApp_A registers RAN sharing services with the Non-RT RIC_A over the R1 interface. At operation 600B, the Non-RT RIC_A sends a message over the R1 interface to the rApp_A indicating a successful registration of the RAN sharing services. At operation 600C, the rApp_B sends a request over the O3 interface to the Non-RT RIC_A regarding the discovery of RAN sharing related services. At operation 600D, the Non-RT RIC_A provides over the O3 interface information on the RAN sharing service producers. For example, the Non-RT RIC_A may list each rApp (e.g., rApp_A) registered with the Non-RT RIC_A. At operation 600E, the rApp_B sends a RAN sharing service subscription request to rApp_A over the O3 interface. At operation 600F, the rApp_A sends a message over the O3 interface indicating a successful subscription of RAN sharing services. The rApp_B may perform the subscription so that rApp_B may understand the services offered under RAN sharing so that rApp_B may request provisioning with rApp_A. Subsequently, based on this request, rApp_A may initiate an instantiation of a network function.

FIGS. 6B_1 and 6B_2 illustrate a sequence diagram of an embodiment of a startup process 602. The startup process may start with a provisioning validation process 602A. At operation 602A_1, Operator B initiates a RAN Sharing request over the NBI to rApp_B. At operation 602A_2, rApp_B sends an initial request over the O3 interface to the rApp_A to instantiate a network function (e.g., NF_B) on the host (e.g., Operator A) O-Cloud infrastructure. As an example, the network function may corresponds to an O-CU function or an O-DU function. The O3 interface may be established between the SMOs or Non-RT RIC. The request to instantiate the NF may include SLA parameters, which may include O-Cloud resource requirements such as memory, compute, control, etc. to instantiate NFs. At operation 602A_3, the rApp_A sends a provisioning verification request over the NBI to Operator A, and at operation 602A_4, Operator A sends a message over the NBI indicating a successful validation of the provisioning request.

After successful verification of the request from Operator A, at operation 602B, the rApp_A sends an NF instantiate request to the NFO to instantiate NF_B. At operation 602C, the NFO requests the DMS to create the NF deployment over O-Cloud for NF_B. The NFO may send O-Cloud identifiers to specify a cloud instance for instantiation of NF_B. At operation 602D, the DMS sends a create O-CU_B request to O-RAN site A, and at operation 602E, the DMS sends a create O-DU_B to the O-RAN site A.

Upon successful creation of NFs, at operation 602F, the DMS sends a notification to the NFO indicating the NF (e.g., NF_B) is instantiated. At operation 602G, if rApp_A has subscribed to the notification, the DMS sends a notification over an O2-DMS interface to the rApp_A indicating the NF (e.g., NF_B) is instantiated. The startup process 602 may further include a notification process 602H for notifying the rApp_B of the instantiation of the NF. At operation 602H_1, the rApp_A notifies the rApp_B that the provisioning of the NF is complete. Alternatively, if rApp_A is not allowed to send this notification, at operation 602H_2, the DMS sends the notification over the O2-DMS interface to the rApp_B indicating the NF is instantiated. The O2-DMS interface may be an O2 interface established between SMO_B and O-Cloud_A.

Figure 6C:
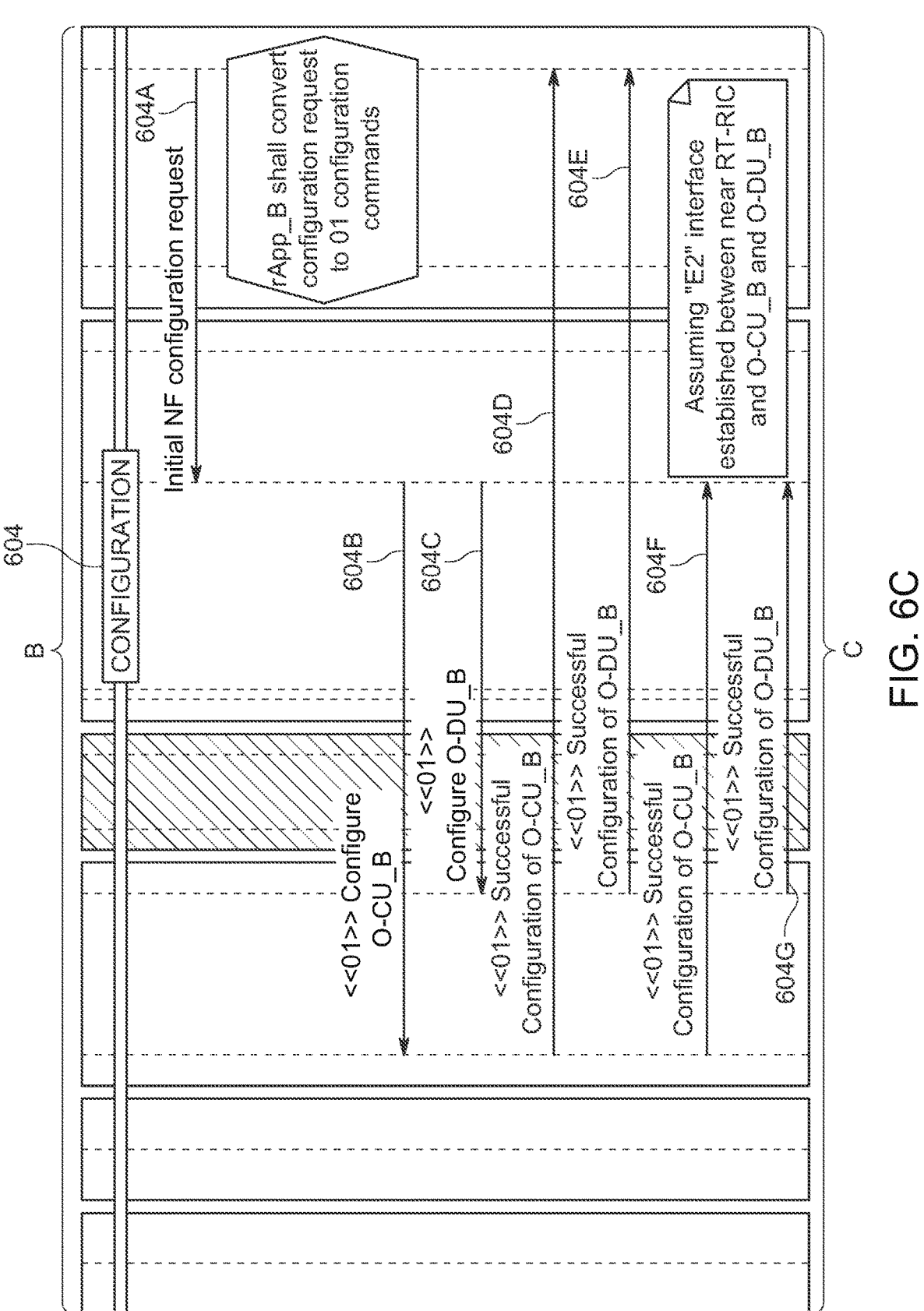

FIG. 6C illustrates a diagram of an embodiment of a configuration process 604 performed after the NF is instantiated. At operation 604A, the rApp_B sends an initial NF configuration request to the rApp_A. At operation 604_B, the rApp_A sends a configure O-CU-B message to the O-CU_B over the O1 interface. At operation 604C, rApp_A sends a configure O-DU_B message to the O-DU_B over the O1 interface. The operations 604B and 604C may convert the received configuration request to O1 commands to configure the newly created NF. At operation 604D, the O-CU_B sends a successful configuration message to rApp_B, and at operation 604E, the O-DU_B sends a successful configuration message to rApp_B. At operation 604F, the O-CU_B sends a successful configuration message to rApp_A, and at operation 604G, the O-DU_B sends a successful configuration message to rApp_A.

Figure 6D:
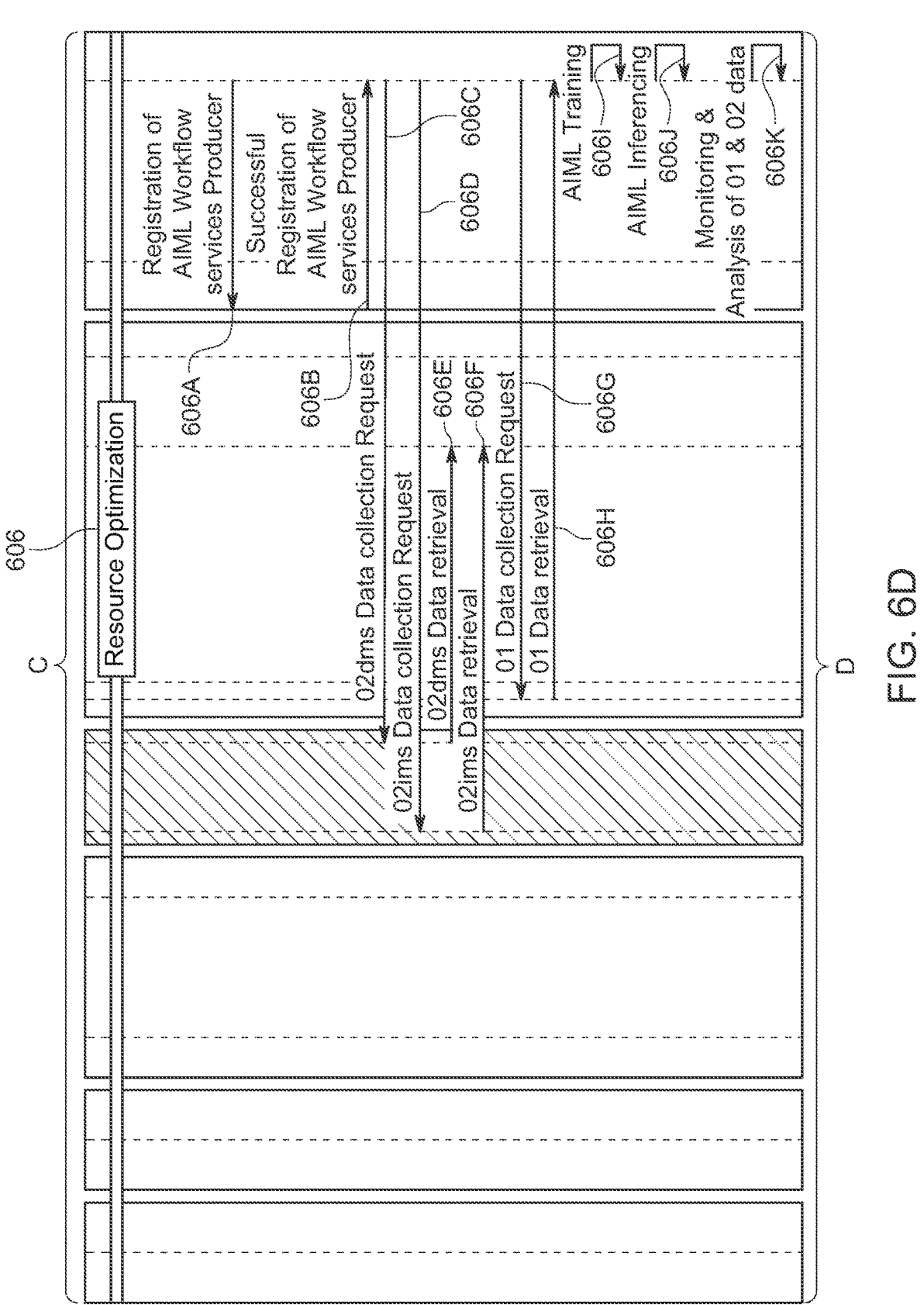

FIGS. 6D, 6E_1 and 6E_2 illustrate sequence diagrams of an embodiment of a resource optimization process 606 that is performed after the NF is instantiated and configured. The rApp_B may collect O1 and O2 data for analysis of performance of deployed NFs on the host O-Cloud. Furthermore, the rApp_B may register as a AIML Service producer to train an AIML model with collected O1 and O2 data to predict additional resource requirements.

At operation 606A, rApp_B sends a registration message to the Non-RT RIC_B for registration of AIML workflow services producer. At operation 606B, the Non-RT RIC_B sends a response to rApp_B indicating successful registration. At operation 606C, rApp_B sends a data collection request over the O2-DMS interface to the O-DU_B, and at operation 606D, rApp_B sends a data collection request over the O2-DMS interface to the O-CU_B. At operation 606E, rApp_A retrieves data from the O-DU_B over the O2-DMS interface, and at operation 606F, rApp_A retrieves data from the O-CU_B over the O2-DMS interface.

At operation 606G, rApp_B sends a data collection request over the O1 interface to the OAM_A. At operation 606H, rApp_B retrieves data from the OAM_A over the O1 interface. At operation 606I, rApp_B performs AIML training, at operation 606J, rApp_B performs AIML inferencing, and at operation 606K, rApp_B performs monitoring and analysis of O1 and O2 data.

Based upon the analysis of operations 606I, 606J, and 606K, the rApp_B may request additional O-cloud resources for the instantiated NF (e.g. NF_B) to accommodate a predicted rise in traffic and signaling. At operation 606L, rApp_B sends an additional O-cloud resource request to the rApp_A. This request may include an updated SLA agreement. At operation 606M, rApp_A sends an updated SLAs verification request over the NBI to Operator A. Operator A may validate the request based upon agreement between Operator A and B, which may be performed externally. At operation 606N, Operator A sends a message over the NBI to rApp_A indicating successful validation of the updated SLAs.

At operation 606O, rApp_A sends a scale in request to the NFO over the R1 interface. At operation 606P, the NFO requests the DMS over the O2-DMS interface to create additional NF deployment over the O-cloud. The NFO may send O-Cloud identifiers to specify cloud instance for instantiation, which may be the same identifiers used earlier to create the NF (e.g., NF_B).

At operation 606Q, the DMS sends a create an additional O-CU_B instance, and at operation 606R, the DMS sends a create an additional O-DU_B instance. Upon successful creation of additional instances of NFs, the DMS notifies the NFO at operation 606S. If rApp_A has subscribed to this notification, then the DMS notifies rApp_A at operation 606T. The resource optimization process 606 may include a notification process 606U for notifying rApp_B of successful scale-in of the NF. If the rApp_A is configured to notify rApp_B, rApp_A sends a scale-in completion notification to rApp_B at operation 606U_1. Otherwise, the DMS sends the scale-in completion notification over the O2-DMS interface to rApp_B at operation 606U_2.

Figure 7:
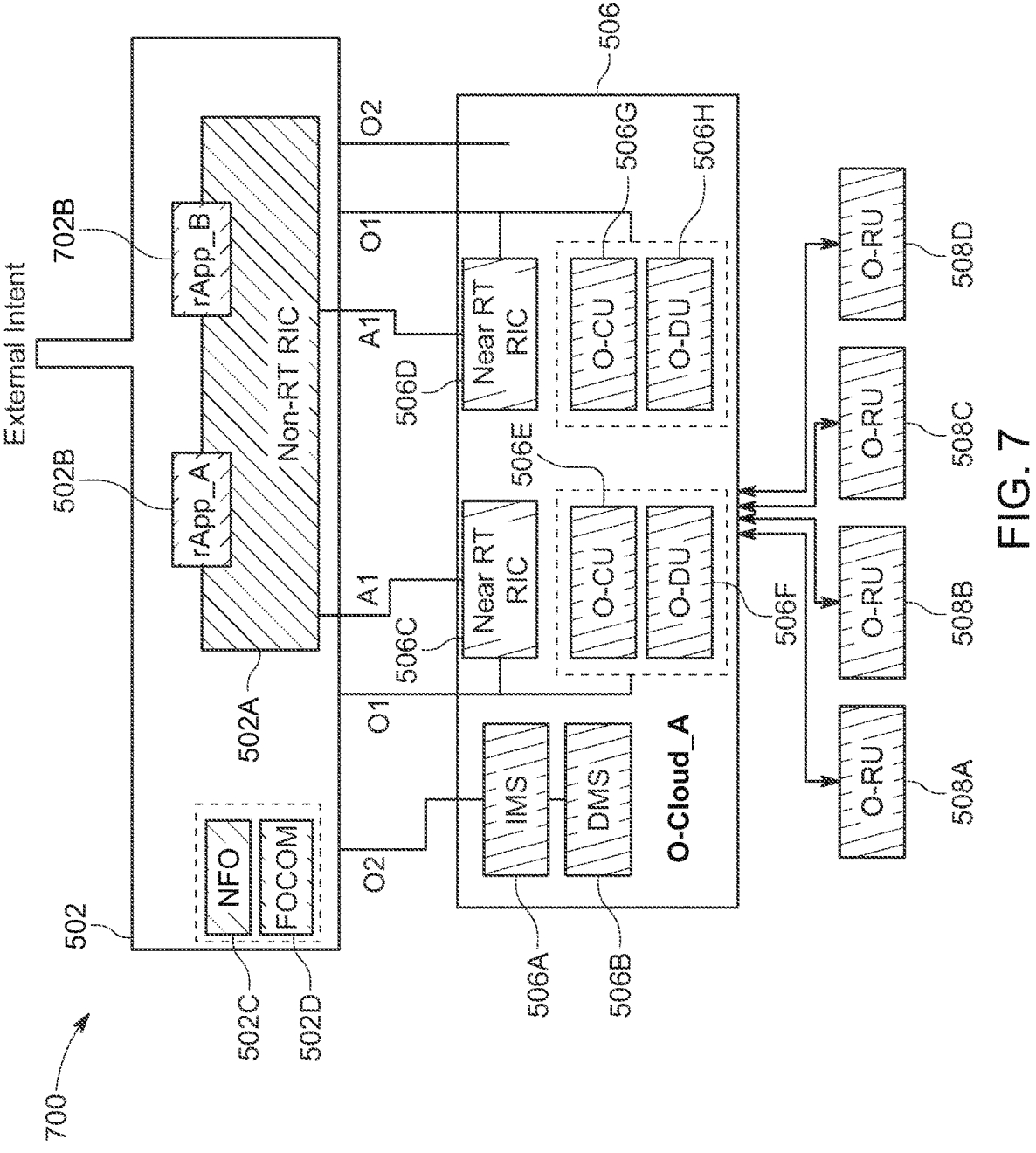
FIG. 7 illustrates an example network architecture with two network operators located in the same SMO platform, in accordance with various embodiments of the present disclosure.

FIG. 7 illustrates an embodiment of an example network architecture 700 in which the tenant operator and the host operator are in the same SMO. For example, compared to the network architecture 500 (FIG. 5), the host operator and tenant operator are both located in SMO 502. In this embodiment, rApp_A 502B is the application from the host operator hosted on Non-RT RIC 502A, and rApp_B 702B is the application of the tenant operator hosted on the Non-RT RIC 502A. The rApp_B 702B may correspond to the rApp_B 502B (FIG. 5), except that rApp_B 702B is located in the SMO 502 of the host operator. Thus, the SMO 502 and RAN 508A may be shared in this embodiment. The tenant operator may communicate SLAs, policies, intent, etc., to the host operator, and the host operator may provide feedback to the tenant operator over the NBI.

The rApp_B 702B may provide initial intent to instantiate NFs on O-Cloud of host operator rApp_A 502B. In this embodiment, a single Non-RT RIC may manage RAN sharing, which may reduce complexity and latency in some cases since there is no need of the O3 interface in this embodiment. The rApp_B 702B may be a 3rd party application, where the tenant operator may host this rApp in the host operator to perform optimization. In this embodiment, the RAN Sharing rApp_A 502B may register RAN sharing services with the Non-RT RIC 502A, and the tenant RAN Sharing rApp_B 702B may subscribe to these services to perform RAN sharing. In this embodiment, O-RUs 508A-508D may be shared or independent among the host and tenant operator.

Figure 8A:
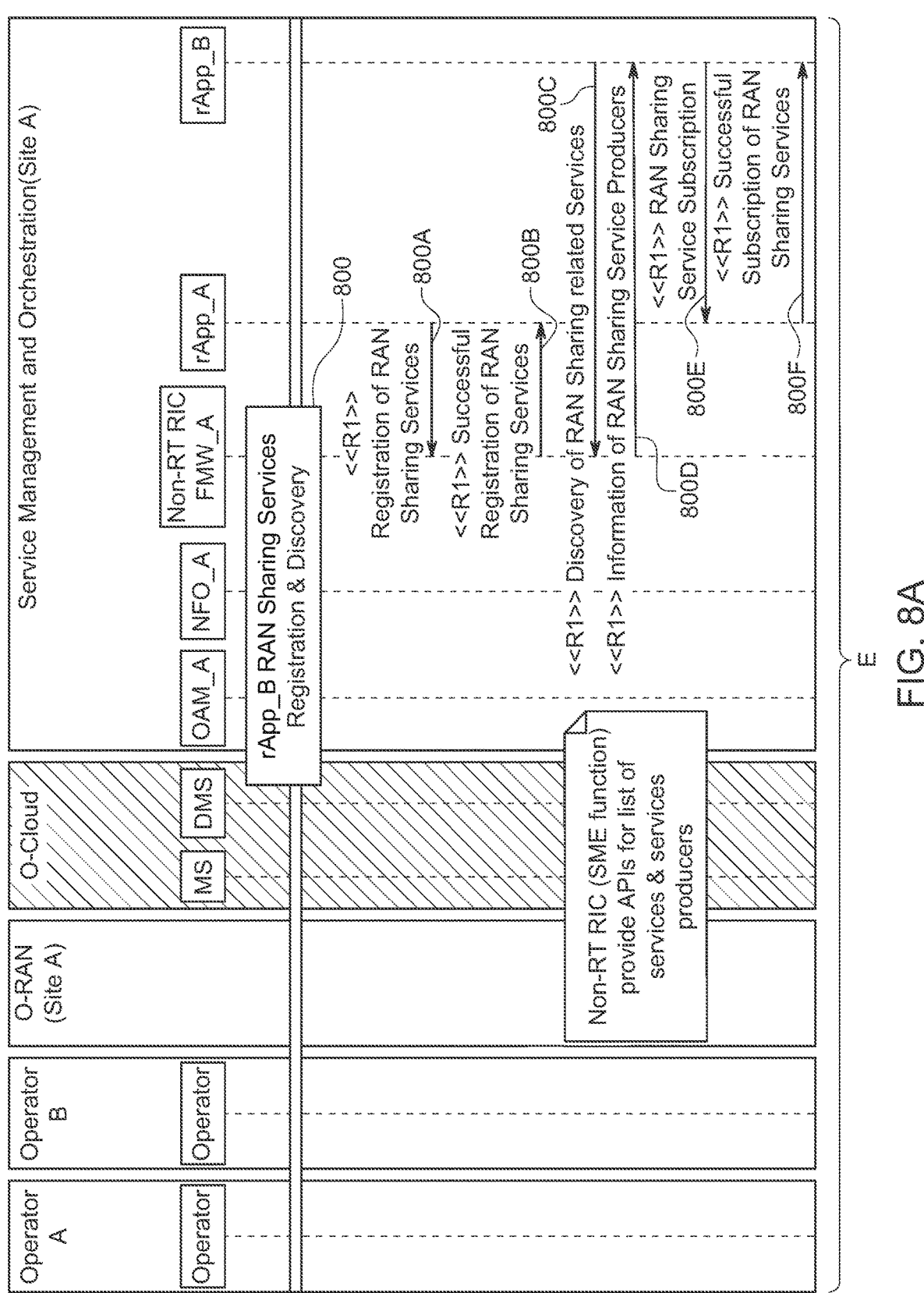

FIGS. 8A-8E_2 illustrate example sequence diagrams corresponding to processes illustrated in FIGS. 6A-6E_2, respectively, with the rApp_A and rApp_B located in the same SMO. FIG. 8A illustrates a sequence diagram of an embodiment of a RAN sharing services registration and discovery process 800 in which the rApp_A may register as a RAN sharing service producer to the Non-RT RIC FMW_A and the rApp_B is discovering and subscribing to those services from the Non-RT RIC_A.

The process may start at operation 800A where the rApp_A registers RAN sharing services with the Non-RT RIC_A over the R1 interface. At operation 800B, the Non-RT RIC_A sends a message over the R1 interface to the rApp_A indicating a successful registration of the RAN sharing services. At operation 800C, the rApp_B sends a request over the R1 interface to the Non-RT RIC_A regarding the discovery of RAN sharing related services. At operation 800D, the Non-RT RIC FMW_A provides over the R1 interface information on the RAN sharing service producers. For example, the Non-RT RIC FMW_A may list each rApp (e.g., rApp_A) registered with the Non-RT RIC FMW_A. At operation 800E, the rApp_B sends a RAN sharing service subscription request to rApp_A over the R1 interface. At operation 800F, the rApp_A sends a message over the O3 interface indicating a successful subscription of RAN sharing services.

FIG. 8B_1 and 8B_2 illustrate a sequence diagram of an embodiment of a startup process 802. The startup process may start with a provisioning validation process 802A. At operation 802A_1, Operator B initiates a RAN Sharing request over the NBI to rApp_B. At operation 802A_2, rApp_B sends an initial request over the R1 interface to the rApp_A to instantiate a network function (e.g., NF_B) on the host (e.g., Operator A) O-Cloud Infrastructure. The request to instantiate the NF may include SLA parameters, which may include O-Cloud resource requirements such as memory, compute, control, etc. to instantiate NFs. At operation 802A_3, the rApp_A sends a provisioning verification request over the NBI to Operator A, and at operation 802A_4, Operator A sends a message over the NBI indicating a successful validation of the provisioning request.

After successful verification of the request from Operator A, at operation 802B, the rApp_A sends an NF instantiate request to the NFO to instantiate NF_B. At operation 802C, the NFO requests the DMS to create the NF deployment over the O-Cloud for NF_B. The NFO may send O-Cloud identifiers to specify a cloud instance for instantiation of NF_B. At operation 802D, the DMS sends a create O-CU_B request to O-RAN site A, and at operation 802E, the DMS sends a create O-DU_B to the O-RAN site A.

Upon successful creation of NFs, at operation 802F, the DMS sends a notification to the NFO indicating the NF (e.g., NF_B) is instantiated. At operation 802G, if rApp_A has subscribed to the notification, the DMS sends a notification over an O2-DMS interface to the rApp_A indicating the NF (e.g., NF_B) is instantiated. The startup process 802 may further include a notification process 802H for notifying the rApp_B of the instantiation of the NF. At operation 802H_1, the rApp_A notifies the rApp_B that the provisioning of the NF is complete. Alternatively, if rApp_A is not allowed to send this notification, at operation 802H_2, the DMS sends the notification over the O2-DMS interface to the rApp_B indicating the NF is instantiated.

Figure 8C:
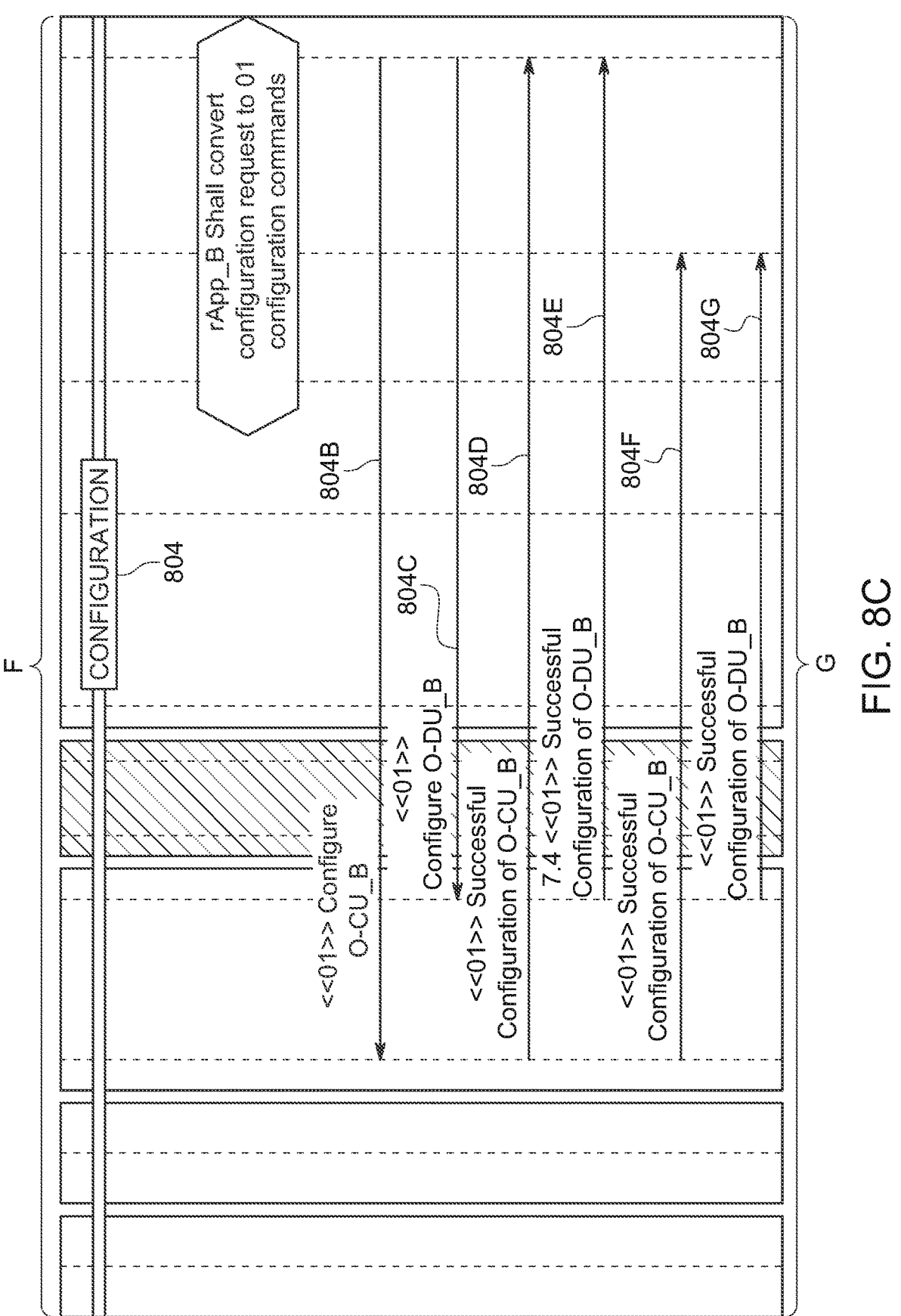

FIG. 8C illustrates a diagram of an embodiment of a configuration process 804 performed after the NF is instantiated. At operation 804_B, the rApp_B sends a configure O-CU-B message to the O-CU_B over the O1 interface. At operation 804C, rApp_B sends a configure O-DU_B message to the O-DU_B over the O1 interface. The operations 804B and 804C may convert the received configuration request to O1 commands to configure the newly created NF. At operation 804D, the O-CU_B sends a successful configuration message to rApp_B, and at operation 804E, the O-DU_B sends a successful configuration message to rApp_B. At operation 804F, the O-CU_B sends a successful configuration message to rApp_A, and at operation 804G, the O-DU_B sends a successful configuration message to rApp_A.

Figure 8D:
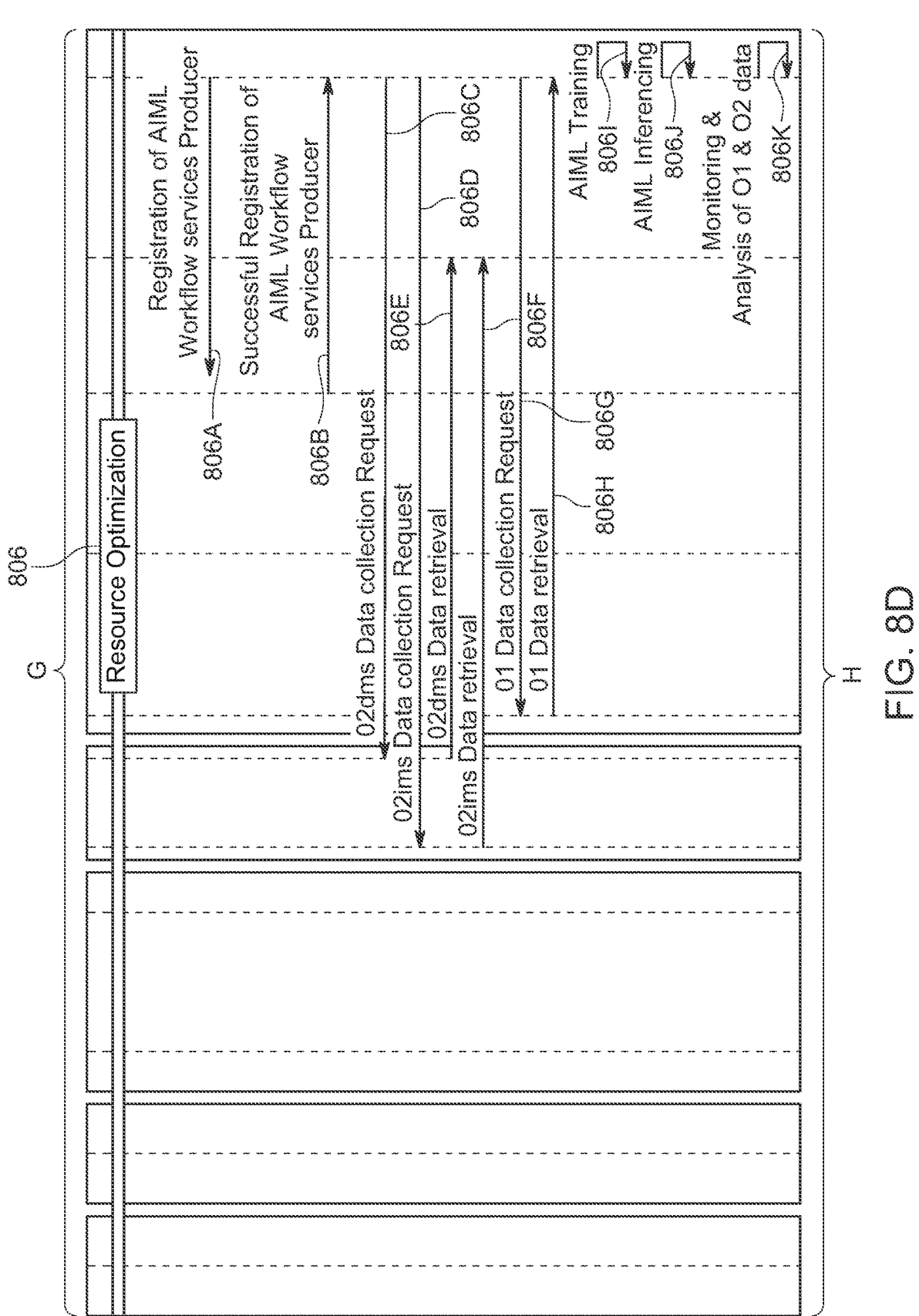

FIGS. 8D, 8E_1 and 8E_2 illustrate sequence diagrams of an embodiment of a resource optimization process 806 that is performed after the NF is instantiated and configured. The rApp_B may collect O1 and O2 data for analysis of performance of deployed NFs on the host O-Cloud. The rApp_B may register as a AIML Service producer to train an AIML model with collected O1 and O2 data to predict additional resource requirements.

At operation 806A, rApp_B sends a registration message to the Non-RT RIC FMW_A for registration of AIML workflow services producer. At operation 806B, the Non-RT FMW_A sends a response to rApp_B indicating successful registration. At operation 806C, rApp_B sends a data collection request over the O2-DMS interface to the O-DU_B, and at operation 806D, rApp_B sends a data collection request over the O2-DMS interface to the O-CU_B. At operation 806E, rApp_A retrieves data from the O-DU_B over the O2-DMS interface, and at operation 806F, rApp_A retrieves data from the O-CU_B over the O2-DMS interface.

At operation 806G, rApp_B sends a data collection request over the O1 interface to the OAM_A. At operation 806H, rApp_B retrieves data from the OAM_A over the O1 interface. At operation 806I, rApp_B performs AIML training, at operation 806J, rApp_B performs AIML inferencing, and at operation 806K, rApp_B performs monitoring and analysis of O1 and O2 data.

Based upon the analysis of operations 806I, 806J, and 806K, the rApp_B may request additional O-cloud resources for the instantiated NF (e.g. NF_B) to accommodate a predicted rise in traffic and signaling. At operation 806L, rApp_B sends an additional O-cloud resource request to the rApp_A over the R1 interface. This request may include an updated SLA agreement. At operation 806M, rApp_A sends an updated SLAs verification request over the NBI to Operator A. Operator A may validate the request based upon agreement between Operator A and B, which may be performed externally. At operation 806N, Operator A sends a message over the NBI to rApp_A indicating successful validation of the updated SLAs.

At operation 806O, rApp_A sends a scale in request to the NFO over the R1 interface. At operation 806P, the NFO requests the DMS over the O2-DMS interface to create additional NF deployment over the O-cloud. The NFO may send O-Cloud identifiers to specify cloud instance for instantiation, which may be the same identifiers used earlier to create the NF (e.g., NF_B).

At operation 806Q, the DMS sends a create an additional O-CU_B instance, and at operation 806R, the DMS sends a create an additional O-DU_B instance. Upon successful creation of additional instance of NFs, DMS notifies the NFO at operation 806S. If rApp_A has subscribed to this notification, then DMS notifies rApp_A 806T. The resource optimization process 806 may include a notification process 806U for notifying rApp_B of successful scale-in of the NF. If the rApp_A is configured to notify rApp_B, rApp_A sends a scale-in completion notification to rApp_B at operation 806U_1. Otherwise, the DMS sends the scale-in completion notification over the O2-DMS interface to rApp_B at operation 806U_2.

FIG. 9 illustrates a flowchart of an embodiment of a process of a network resource sharing process 900. The process may be performed by a first application associated with a first network operator. The first application may communicate with a second application over an interface, where the second application is associated with a second network interface. As an example, the first application may correspond to rApp_A in FIGS. 6A-6E_2 or FIGS. 8A-8E_2, and the second application may correspond to rApp_B in FIGS. 6A-6E_2 or FIGS. 8A-8E_2. The process may start at operation S902 where the first application receives, over the interface from the second application hosed on a Non-RT RIC, information regarding one or more sharing services registered by the second application on the non-RT RIC. The one or more sharing services may correspond to one or more network resources associated with the second network operator.

The process proceeds to operation S904, where the first application transmits, over the interface to the second application, a subscription request to the one or more sharing services. The process proceeds to operation S906 where the first application receives, over the interface from the second application in response to the subscription request, a subscription confirmation. The operation proceeds to S908 where the first application transmits over the interface to the second application, a network function instantiation request. The operation proceeds to S910 where the first application receives, in response to the network function instantiation request, a notification confirming that the network function is instantiated. The process proceeds to operation S912 where the first application monitors performance of the instantiated network function on the one or more network resources.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed by at least one processor executing a first application, the first application associated with a first network operator, the method including: receiving, over an interface from a second application hosted on a non-real time (Non-RT) radio access network (RAN) intelligent controller (RIC), information regarding one or more sharing services registered by the second application on the Non-RT RIC, the second application associated with a second network operator, the one or more sharing services corresponding to one or more network resources associated with the second network operator; transmitting, over the interface to the second application, a subscription request to the one or more sharing services: receiving, over the interface from the second application in response to the subscription request, a subscription confirmation indicating a successful subscription to the one or more sharing services: transmitting, over the interface to the second application, a network function instantiation request that requests instantiation of a network function that utilizes the one or more network resources of the second network operator: receiving, in response to the network function instantiation request, a notification confirming that the network function is instantiated; and monitoring performance of the instantiated network function on the one or more network resources.

(2) The method of feature (1), further including: in response to the monitoring, transmitting, over the interface to the second application, a network scaling request that requests an increase in utilization of the one or more network resources.

(3) The method according to feature (1) or (2), in which the monitoring is performed based on data received from at least one of an O1 interface and an O2 interface.

(4) The method according to any one of features (1)-(3), in which the network instantiation request includes one or more parameters that specify one or more network resources of the second network operator required to instantiate the network function.

(5) The method according to any one of features (1)-(4), in which the notification is received from the second application.

(6) The method according to any one of features (1)-(5), in which the notification is received from the one or more network resources associated with the second network operator.

(7) The method according to any one of features (1)-(6), in which the first application is a first rApp provided in another Non-RT RIC, in which the second application is a second rApp, and in which the interface is a communication interface that permits communication between the first rApp and the second rApp.

(8) The method according to any one of features (1)-(7), in which the first application is a first rApp provided in the Non-RT RIC, in which the second application is a second rApp, and in which the interface is an R1 interface.

(9) An apparatus executing a first application, the first application associated with a first network operator, the apparatus including: at least one memory configured to store computer program code; and at least one processor configured to access said at least one memory and operate as instructed by said computer program code, said computer program code including: first receiving code configured to cause at least one of said at least one processor to, over an interface from a second application hosted on a non-real time (Non-RT) radio access network (RAN) intelligent controller (RIC), receive information regarding one or more sharing services registered by the second application on the Non-RT RIC, the second application associated with a second network operator, the one or more sharing services corresponding to one or more network resources associated with the second network operator, first transmitting code configured to cause at least one of said at least one processor to, over the interface to the second application, transmit a subscription request to the one or more sharing services, second receiving code configured to cause at least one of said at least one processor to, over the interface from the second application in response to the subscription request, receive a subscription confirmation indicating a successful subscription to the one or more sharing services, second transmitting code configured to cause at least one of said at least one processor to, over the interface to the second application, transmit a network function instantiation request that requests instantiation of a network function that utilizes the one or more network resources of the second network operator, third receiving code configured to cause at least one of said at least one processor to, in response to the network function instantiation request, receive a notification confirming that the network function is instantiated, and monitoring code configured to cause at least one of said at least one processor to monitor performance of the instantiated network function on the one or more network resources.

(10) The apparatus of feature (9), in which said computer program code further includes: third transmitting code configured to cause at least one of said at least one processor to, in response to the monitoring, transmit, over the interface to the second application, a network scaling request that requests an increase in utilization of the one or more network resources.

(11) The apparatus of feature (9) or (10), in which the monitoring is performed based on data received from at least one of an O1 interface and an O2 interface.

(12) The apparatus according to any one of features (9)-(11), in which the network instantiation request includes one or more parameters that specify one or more network resources of the second network operator required to instantiate the network function.

(13) The apparatus according to any one of features (9)-(12), in which the notification is received from the second application.

(14) The apparatus according to any one of features (9)-(13), in which the notification is received from the one or more network resources associated with the second network operator.

(15) The apparatus according to any one of features (9)-(14), in which the first application is a first rApp provided in another Non-RT RIC, in which the second application is a second rApp, and in which the interface is a communication interface that permits communication between the first rApp and the second rApp.

(16) The apparatus according to any one of features (9)-(15), in which the first application is a first rApp provided in the Non-RT RIC, in which the second application is a second rApp, and in which the interface is an R1 interface.

(17) A non-transitory computer readable medium having instructions stored therein, which when executed by a processor executing a first application associated with a first network operator cause the processor to execute a method including: receiving, over an interface from a second application hosted on a non-real time (Non-RT) radio access network (RAN) intelligent controller (RIC), information regarding one or more sharing services registered by the second application on the Non-RT RIC, the second application associated with a second network operator, the one or more sharing services corresponding to one or more network resources associated with the second network operator: transmitting, over the interface to the second application, a subscription request to the one or more sharing services; receiving, over the interface from the second application in response to the subscription request, a subscription confirmation indicating a successful subscription to the one or more sharing services; transmitting, over the interface to the second application, a network function instantiation request that requests instantiation of a network function that utilizes the one or more network resources of the second network operator; receiving, in response to the network function instantiation request, a notification confirming that the network function is instantiated; and monitoring performance of the instantiated network function on the one or more network resources.

(18) The non-transitory computer readable medium of feature (17), further including: in response to the monitoring, transmitting, over the interface to the second application, a network scaling request that requests an increase in utilization of the one or more network resources.

(19) The non-transitory computer readable medium of feature (17) or (18), in which the monitoring is performed based on data received from at least one of an O1 interface and an O2 interface.

(20) The non-transitory computer readable medium according to any one of features (17)-(19), in which the network instantiation request includes one or more parameters that specify one or more network resources of the second network operator required to instantiate the network function.

What is claimed is:

1. A method performed by at least one processor executing a first application, the first application associated with a first network operator, the method comprising:
receiving, by the first application over an interface from a second application hosted on a non-real time (Non-RT) radio access network (RAN) intelligent controller (RIC), information regarding one or more sharing services registered by the second application on the Non-RT RIC, the second application associated with a second network operator, the one or more sharing services corresponding to one or more network resources associated with the second network operator, the first network operator and the second network operator being distinct mobile network operators, the first network operator being an operator of a first RAN, and the second network operator being an operator of a second RAN different from the first RAN;
transmitting, over the interface to the second application, a subscription request to the one or more sharing services;
receiving, over the interface from the second application in response to the subscription request, a subscription confirmation indicating a successful subscription to the one or more sharing services;
transmitting, over the interface to the second application, a network function instantiation request that requests instantiation of a network function that utilizes the one or more network resources of the second network operator;
receiving, in response to the network function instantiation request, a notification confirming that the network function is instantiated; and
monitoring performance of the instantiated network function on the one or more network resources,
wherein the first application is a first rApp provided in another Non-RT RIC associated with the first network operator, wherein the second application is a second rApp, and wherein the interface is a communication interface that permits communication between the first rApp and the second rApp and that extends between the Non-RT RIC associated with the second network operator and the other Non-RT RIC associated with the first network operator.

2. The method of claim 1, further comprising:
in response to the monitoring, transmitting, over the interface to the second application, a network scaling request that requests an increase in utilization of the one or more network resources.

3. The method of claim 1, wherein the monitoring is performed based on data received from at least one of an O1 interface and an O2 interface.

4. The method of claim 1, wherein the network instantiation request includes one or more parameters that specify one or more network resources of the second network operator required to instantiate the network function.

5. The method of claim 1, wherein the notification is received from the second application.

6. The method of claim 1, wherein the notification is received from the one or more network resources associated with the second network operator.

7. An apparatus executing a first application, the first application associated with a first network operator, the apparatus comprising:
at least one memory configured to store computer program code; and
at least one processor configured to access said at least one memory and operate as instructed by said computer program code, said computer program code including:
first receiving code configured to cause at least one of said at least one processor to, over an interface from a second application hosted on a non-real time (Non-RT) radio access network (RAN) intelligent controller (RIC), receive by the first application information regarding one or more sharing services registered by the second application on the Non-RT RIC, the second application associated with a second network operator, the one or more sharing services corresponding to one or more network resources associated with the second network operator, the first network operator and the second network operator being distinct mobile network operators, the first network operator being an operator of a first RAN, and the second network operator being an operator of a second RAN different from the first RAN, first transmitting code configured to cause at least one of said at least one processor to, over the interface to the second application, transmit a subscription request to the one or more sharing services, second receiving code configured to cause at least one of said at least one processor to, over the interface from the second application in response to the subscription request, receive a subscription confirmation indicating a successful subscription to the one or more sharing services, second transmitting code configured to cause at least one of said at least one processor to, over the interface to the second application, transmit a network function instantiation request that requests instantiation of a network function that utilizes the one or more network resources of the second network operator, third receiving code configured to cause at least one of said at least one processor to, in response to the network function instantiation request, receive a notification confirming that the network function is instantiated, and monitoring code configured to cause at least one of said at least one processor to monitor performance of the instantiated network function on the one or more network resources, wherein the first application is a first rApp provided in another Non-RT RIC associated with the first network operator, wherein the second application is a second rApp, and wherein the interface is a communication interface that permits communication between the first rApp and the second rApp and that extends between the Non-RT RIC associated with the second network operator and the other Non-RT RIC associated with the first network operator.

8. The apparatus of claim 7, wherein said computer program code further includes:

third transmitting code configured to cause at least one of said at least one processor to, in response to the monitoring, transmit, over the interface to the second application, a network scaling request that requests an increase in utilization of the one or more network resources.

9. The apparatus of claim 7, wherein the monitoring is performed based on data received from at least one of an O1 interface and an O2 interface.

10. The apparatus of claim 7, wherein the network instantiation request includes one or more parameters that specify one or more network resources of the second network operator required to instantiate the network function.

11. The apparatus of claim 7, wherein the notification is received from the second application.

12. The apparatus of claim 7, wherein the notification is received from the one or more network resources associated with the second network operator.

13. A non-transitory computer readable medium having instructions stored therein, which when executed by a processor executing a first application associated with a first network operator cause the processor to execute a method comprising:

receiving, by the first application over an interface from a second application hosted on a non-real time (Non-RT) radio access network (RAN) intelligent controller (RIC), information regarding one or more sharing services registered by the second application on the Non-RT RIC, the second application associated with a second network operator, the one or more sharing services corresponding to one or more network resources associated with the second network operator, the first network operator and the second network operator being distinct mobile network operators, the first network operator being an operator of a first RAN, and the second network operator being an operator of a second RAN different from the first RAN;

transmitting, over the interface to the second application, a subscription request to the one or more sharing services;

receiving, over the interface from the second application in response to the subscription request, a subscription confirmation indicating a successful subscription to the one or more sharing services;

transmitting, over the interface to the second application, a network function instantiation request that requests instantiation of a network function that utilizes the one or more network resources of the second network operator;

receiving, in response to the network function instantiation request, a notification confirming that the network function is instantiated; and monitoring performance of the instantiated network function on the one or more network resources, wherein the first application is a first rApp provided in another Non-RT RIC associated with the first network operator, wherein the second application is a second rApp, and wherein the interface is a communication interface that permits communication between the first rApp and the second rApp and that extends between the Non-RT RIC associated with the second network operator and the other Non-RT RIC associated with the first network operator.

14. The non-transitory computer readable medium of claim 13, further comprising:

in response to the monitoring, transmitting, over the interface to the second application, a network scaling request that requests an increase in utilization of the one or more network resources.

15. The non-transitory computer readable medium of claim 13, wherein the monitoring is performed based on data received from at least one of an O1 interface and an O2 interface.

16. The non-transitory computer readable medium of claim 13, wherein the network instantiation request includes one or more parameters that specify one or more network resources of the second network operator required to instantiate the network function.

* * * * *